(12) United States Patent
Takeuchi

(10) Patent No.: US 8,144,380 B2
(45) Date of Patent: Mar. 27, 2012

(54) DRIVE MECHANISM

(75) Inventor: Kesatoshi Takeuchi, Suwa (JP)

(73) Assignee: Seiko Epson Corporation (JP)

( * ) Notice: Subject to any disclaimer, the term of this patent is extended or adjusted under 35 U.S.C. 154(b) by 1660 days.

(21) Appl. No.: 10/528,618

(22) PCT Filed: Sep. 26, 2003

(86) PCT No.: PCT/JP03/12352
§ 371 (c)(1), (2), (4) Date: Mar. 21, 2005

(87) PCT Pub. No.: WO2004/030407
PCT Pub. Date: Apr. 8, 2004

(65) Prior Publication Data
US 2006/0028751 A1 Feb. 9, 2006

(30) Foreign Application Priority Data

Sep. 26, 2002 (JP) .................. 2002-281843
Dec. 9, 2002 (JP) .................. 2002-357156
Jan. 8, 2003 (JP) .................. 2003-002562
Jan. 22, 2003 (JP) .................. 2003-014026
Feb. 14, 2003 (JP) .................. 2003-037147

(51) Int. Cl.
G02B 26/08 (2006.01)
G02B 26/10 (2006.01)

(52) U.S. Cl. ............... 359/199.3; 359/199.1; 359/200.7; 359/846; 359/904; 381/117

(58) Field of Classification Search ............... 359/199.3, 359/196.1, 198.1, 199.1, 200.7, 290, 291, 359/295, 846, 849, 904; 318/599; 381/117
See application file for complete search history.

(56) References Cited

U.S. PATENT DOCUMENTS

| | | | |
|---|---|---|---|
| 3,798,391 A | 3/1974 | Parker | |
| 5,036,930 A | 8/1991 | Bisel et al. | |
| 5,131,048 A | 7/1992 | Stevenson et al. | |
| 5,304,954 A | 4/1994 | Saito et al. | |
| 5,448,116 A | 9/1995 | Weiss et al. | |
| 5,701,358 A | 12/1997 | Larsen et al. | |
| 6,025,951 A * | 2/2000 | Swart et al. | 359/245 |

(Continued)

FOREIGN PATENT DOCUMENTS

BE 341 619 A 5/1927

(Continued)

OTHER PUBLICATIONS

Arai, K. I., et al: "Fabrication of Small Flying Machines Using Magnetic Thin Films", 1995 Digests of Intermag., International Magnetics Conference; San Antonio, Apr. 18-21, 1995, Preceedings of the International Magnetics Conference (INTERMAG) New York, IEEE, US, Apr. 18, 1995, pp. HR-18, XP000582255; ISBN: 0-7803-2606-7.

(Continued)

*Primary Examiner* — Xu Mei
(74) *Attorney, Agent, or Firm* — Harness, Dickey & Pierce, P.L.C.

(57) ABSTRACT

A drive mechanism @is comprised with a set comprising a plurality of magnetic bodies, means for supplying a frequency signal to said set, and means for producing movement caused by the attraction/repulsion between the magnetic bodies. The movement is the driving source of the drive mechanism.

4 Claims, 33 Drawing Sheets

U.S. PATENT DOCUMENTS

| | | | |
|---|---|---|---|
| 6,094,293 | A | 7/2000 | Ota et al. |
| 6,192,136 | B1 | 2/2001 | Azima et al. |
| 6,249,367 | B1 | 6/2001 | Hirose |
| 6,547,145 | B2 * | 4/2003 | Colley et al. ............. 235/462.36 |
| 6,574,026 | B2 * | 6/2003 | Jin et al. ................. 359/224.1 |
| 6,753,931 | B2 * | 6/2004 | Kane et al. ................... 348/742 |
| 6,992,810 | B2 * | 1/2006 | Pan et al. ....................... 359/290 |
| 2002/0096970 | A1 | 7/2002 | Atsuta et al. |
| 2002/0135864 | A1 | 9/2002 | Chiu et al. |

FOREIGN PATENT DOCUMENTS

| | | |
|---|---|---|
| BE | 902 749 A | 10/1985 |
| CH | 92 529 A | 1/1922 |
| CH | 113 262 A | 1/1926 |
| DE | 14 88 428 A | 4/1970 |
| DE | 100 22 150 A | 11/2001 |
| DE | 100 37 373 C | 7/2002 |
| EP | 0 845 920 A | 6/1998 |
| EP | 1 079 255 A | 2/2001 |
| JP | 50-013027 | 6/1973 |
| JP | 62-076395 | 4/1987 |
| JP | 07-306368 A | 11/1995 |
| JP | 08-036806 | 2/1996 |
| JP | 08-248334 | 9/1996 |
| JP | 09-018555 A | 1/1997 |
| JP | 10-174331 A | 6/1998 |
| JP | 11-202226 | 7/1999 |
| JP | 2000-166174 A | 6/2000 |
| JP | 2000-325881 | 11/2000 |
| JP | 2001-333493 A | 11/2001 |
| JP | 2002-178856 | 6/2002 |
| NL | 15 084 C | 2/1926 |
| WO | 99/60819 A | 11/1999 |
| WO | 00/79671 A | 12/2000 |

OTHER PUBLICATIONS

Arai, K. I., et al: "Magnetic Small Flying Machines", 1995 8th International Conference on Solid-State Sensors and Actuators and Eurosensors IX. Stockholm, Sweden, Jun. 25-29, 1995, Digest of Technical Papers, vol. 1, Jun. 25, 1995, pp. 316-319, XP010304830; Stockholm, Sweden.

Nishimura, Takeshi, et al.; "Development of a Diaphragm for Planner Acoustic Converting Apparatus"; Furukawa Electric Review, Jun. 2001.

* cited by examiner

FIG.1
(A)
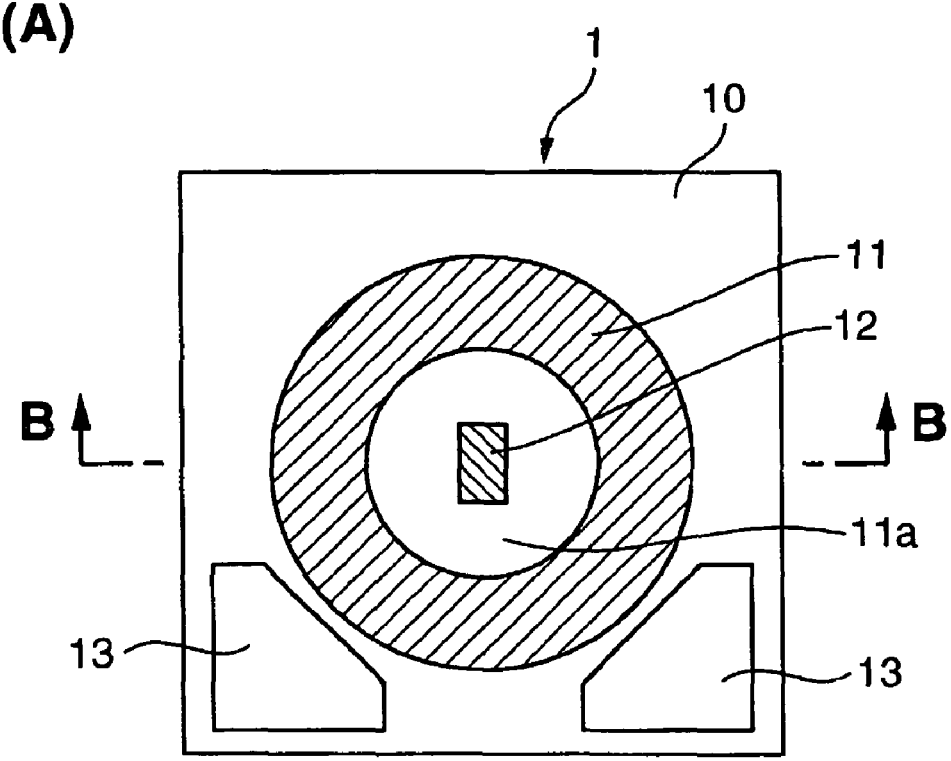
(B)
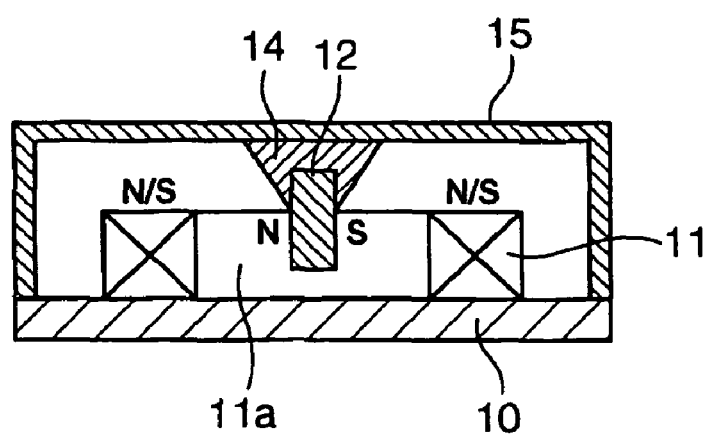

FIG.7
(A)
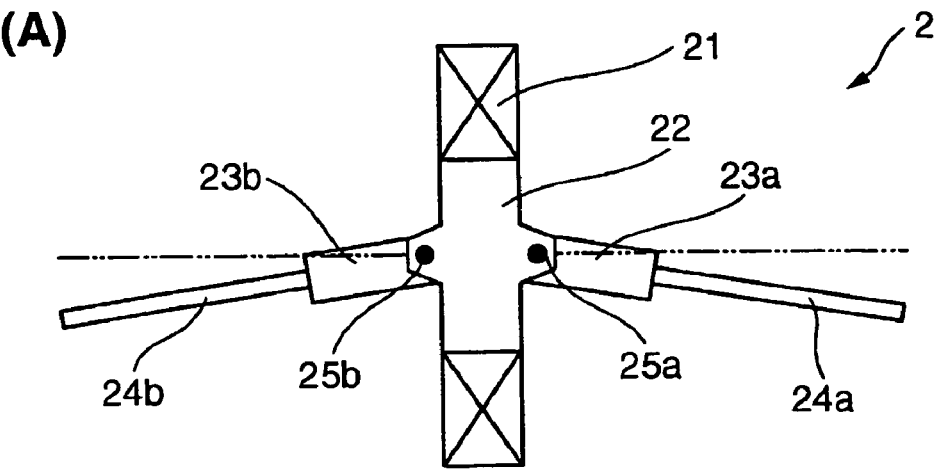
(B)
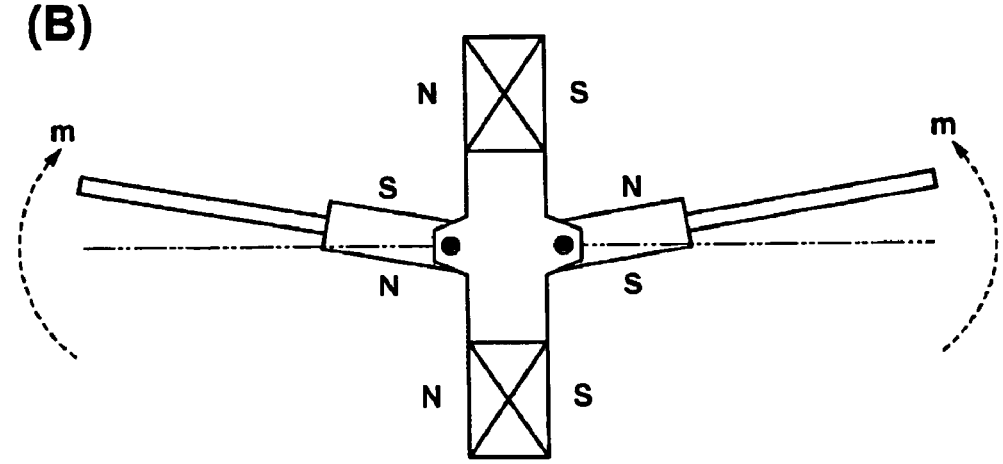
(C)
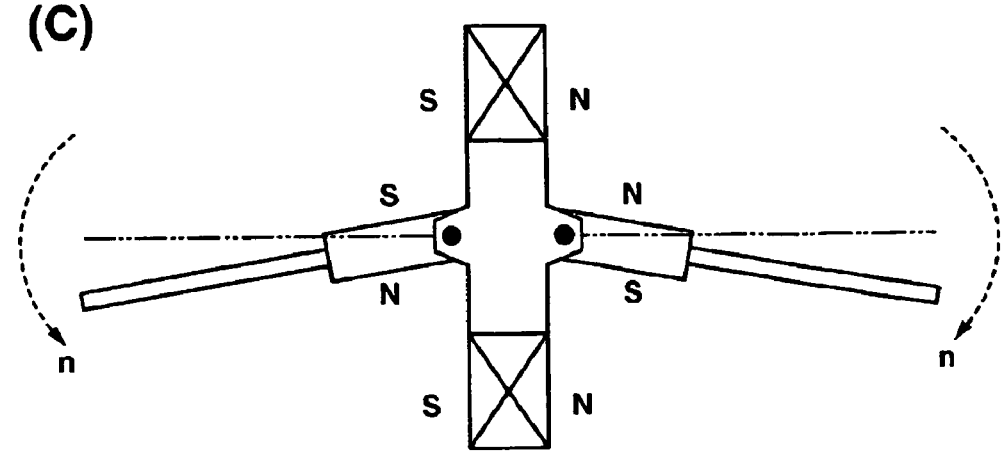

FIG.8
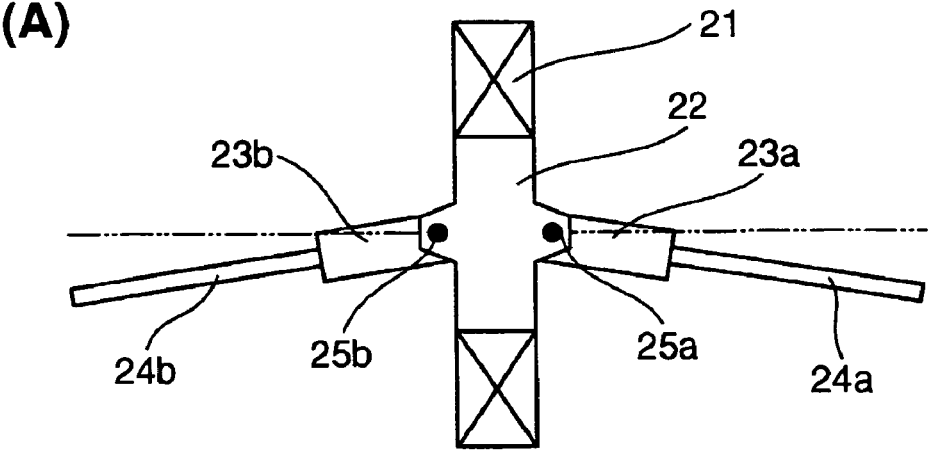
(A)
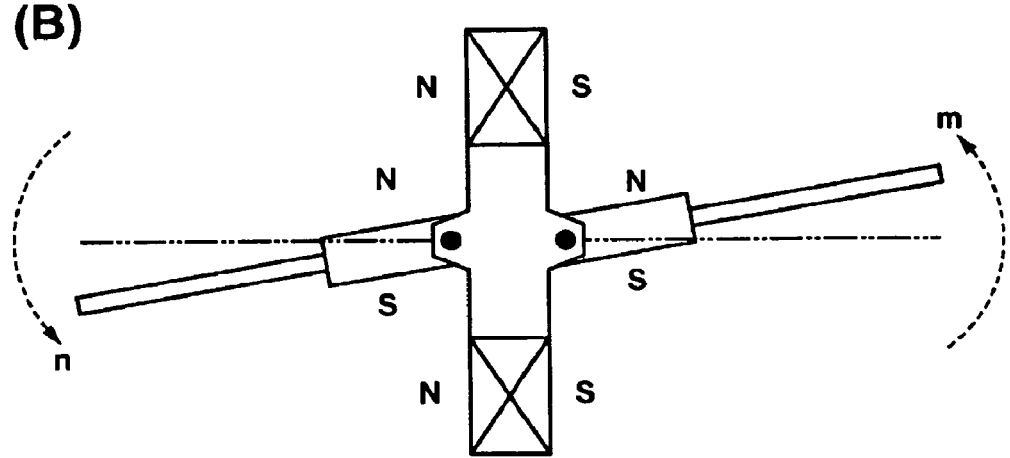
(B)
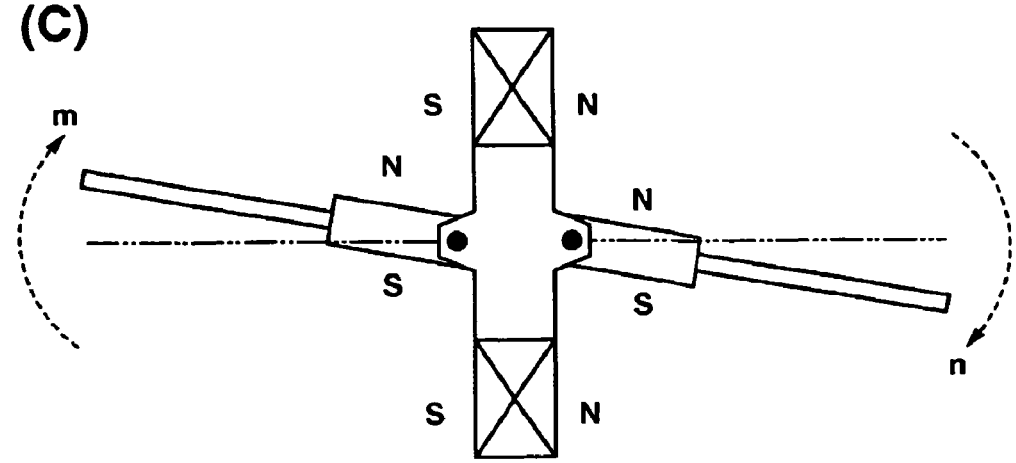
(C)

FIG.11
(A) 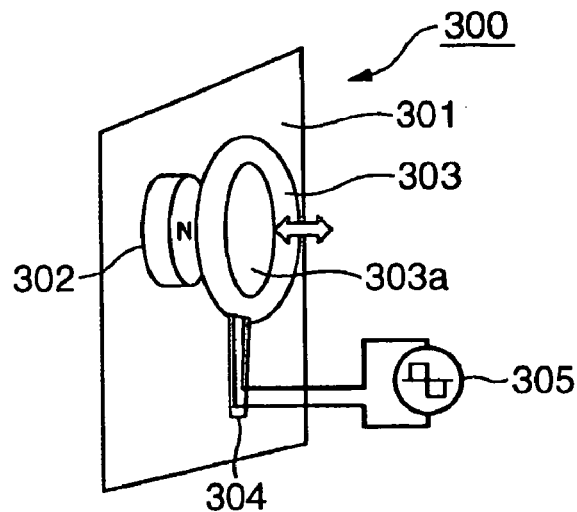
(B) 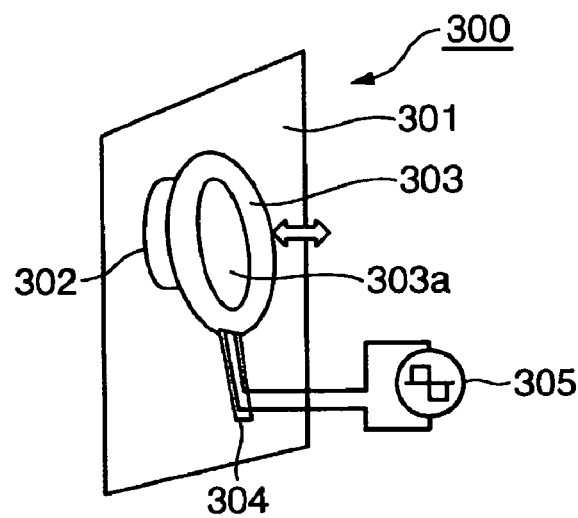
(C) 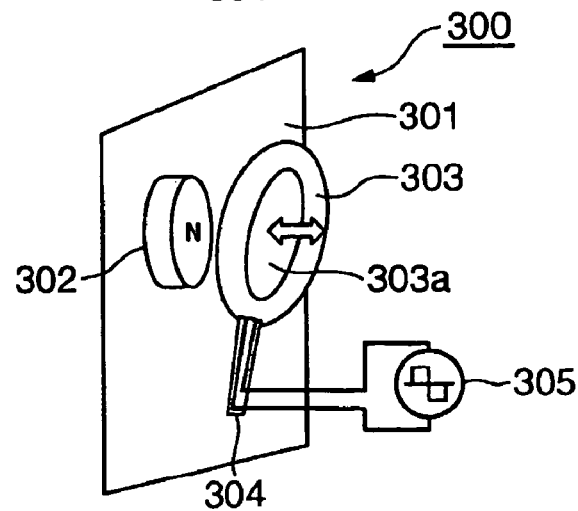

FIG.12
(A)
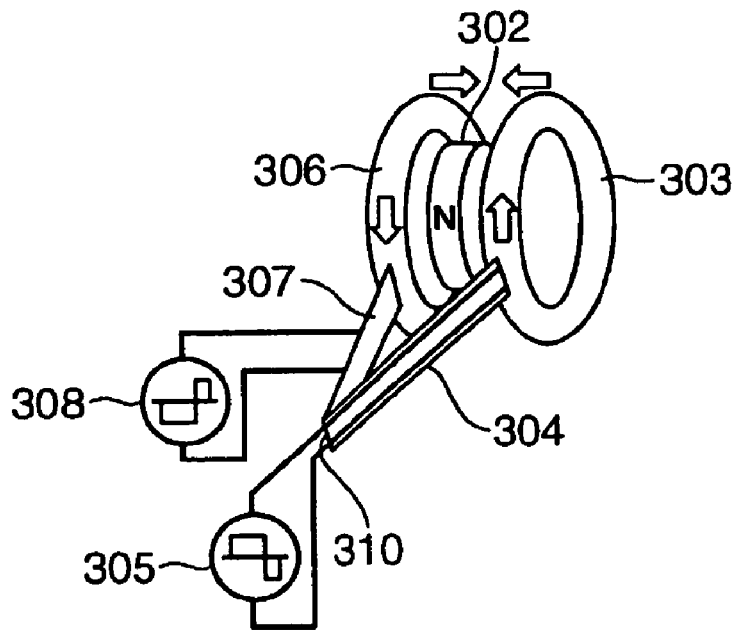
(B)
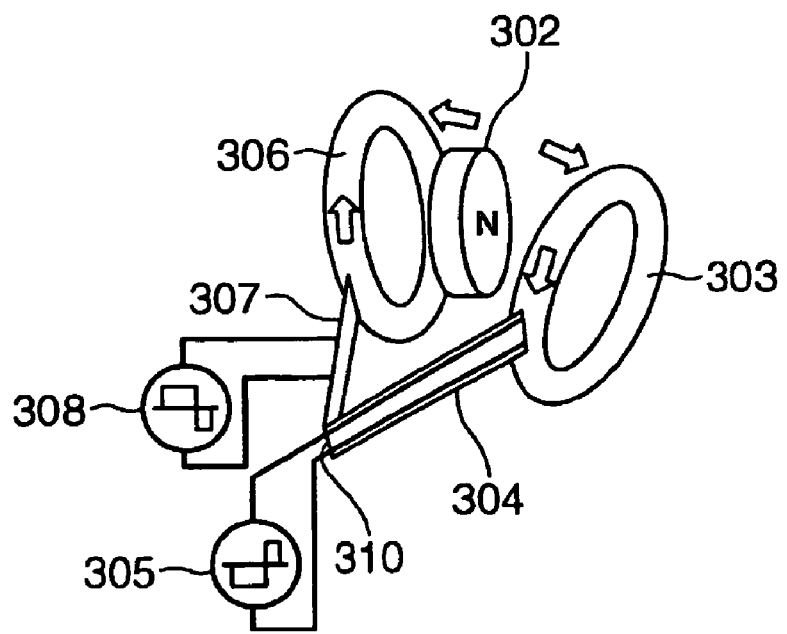

FIG.13
(A) 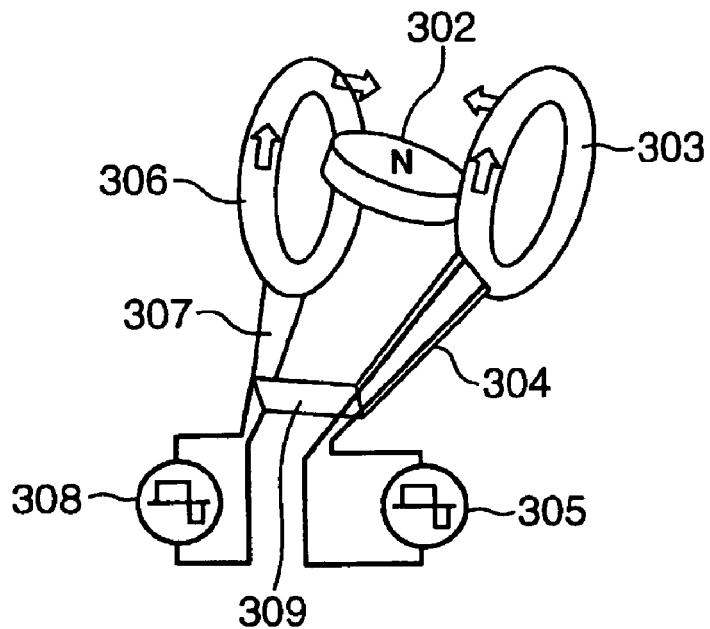
(B) 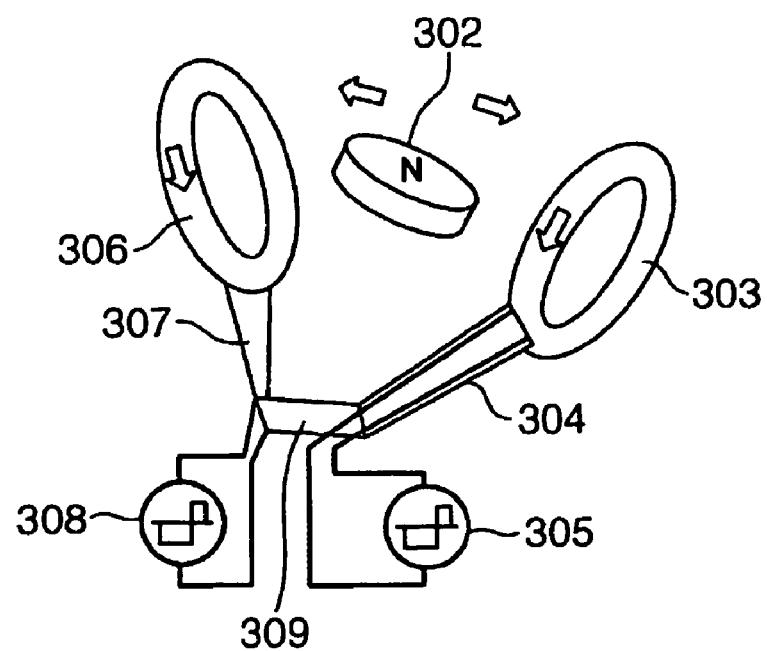

FIG.14
(A)
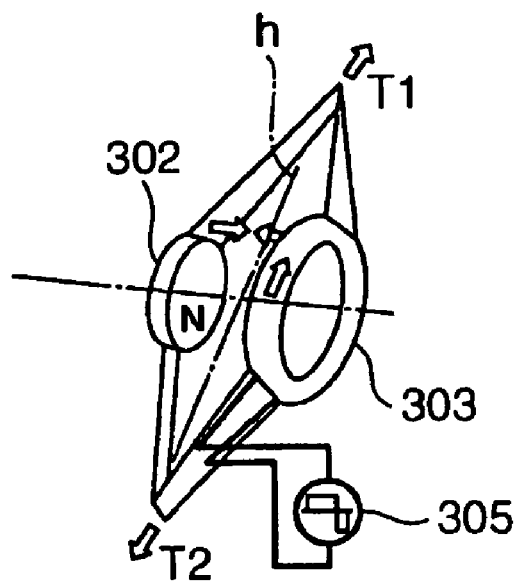
(B)
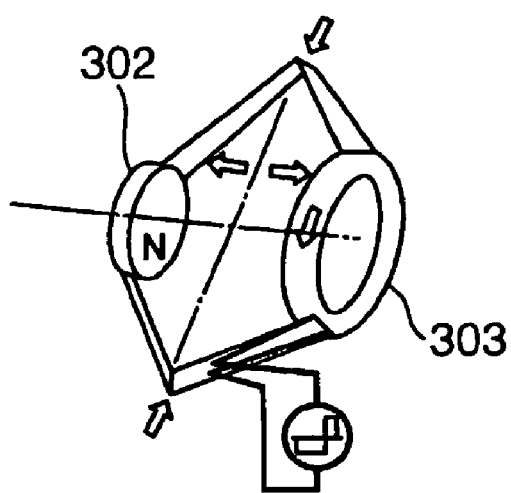

FIG.15
(A)
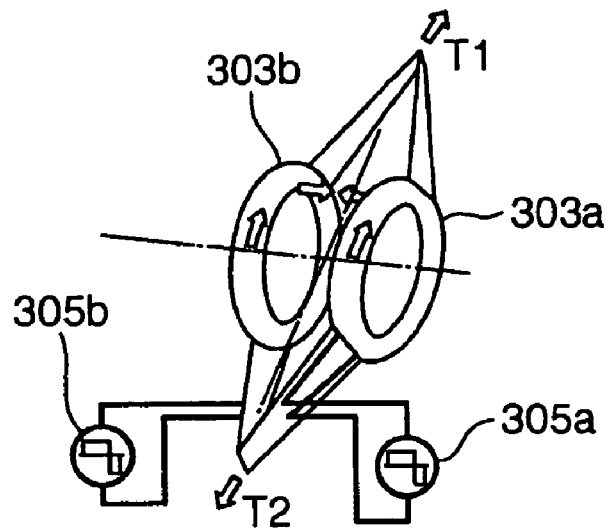
(B)
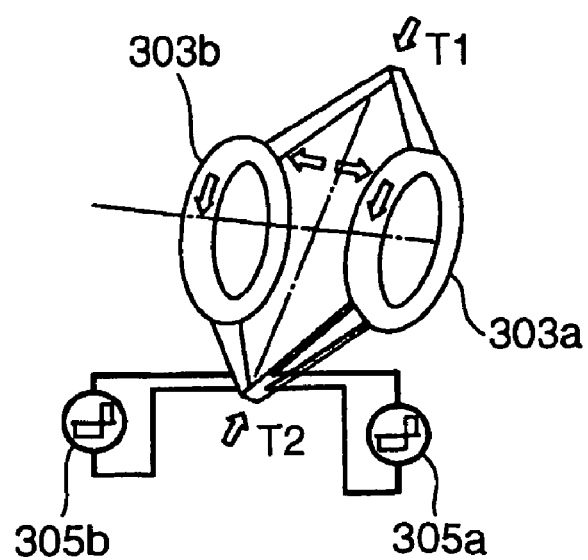

FIG.16
(A)
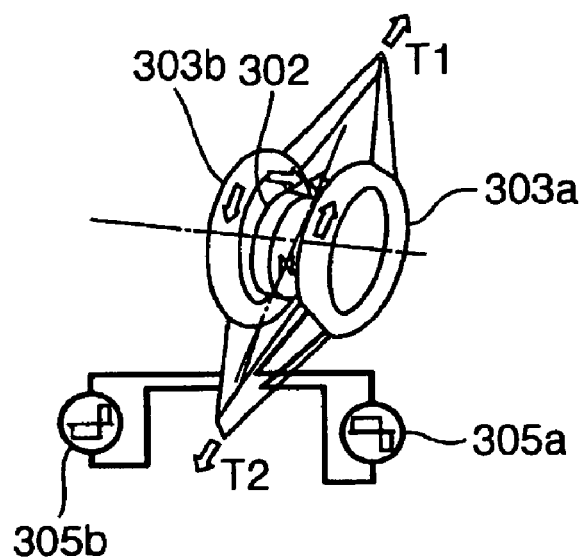
(B)
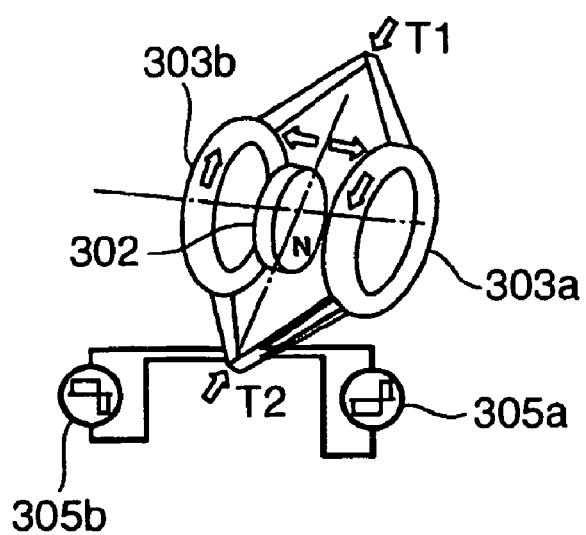

FIG.17
(A)
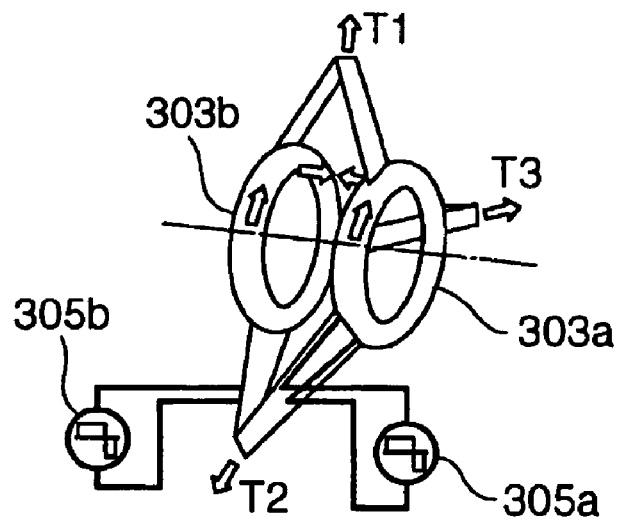
(B)
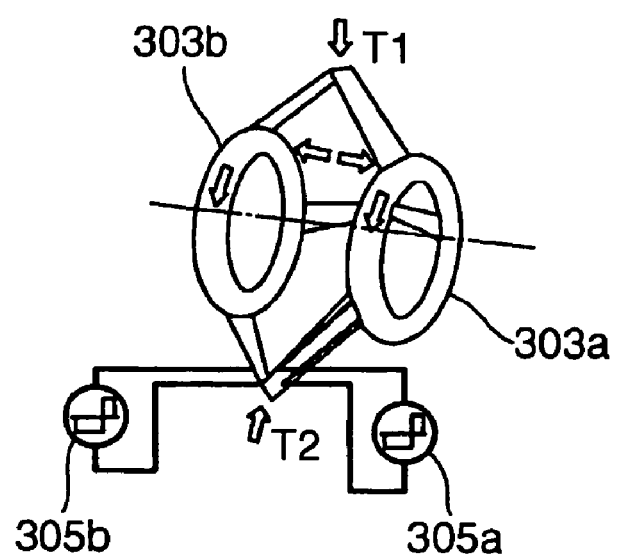

(A) (B)

FIG.34
(1)
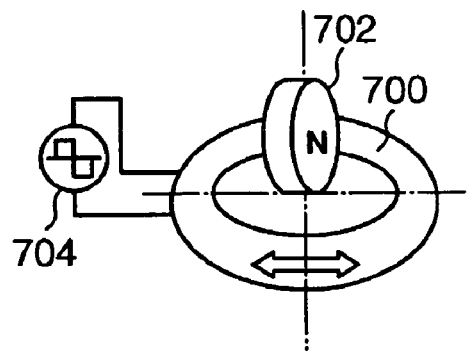
(2)
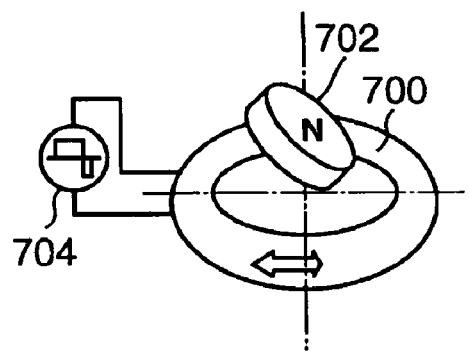
(3)
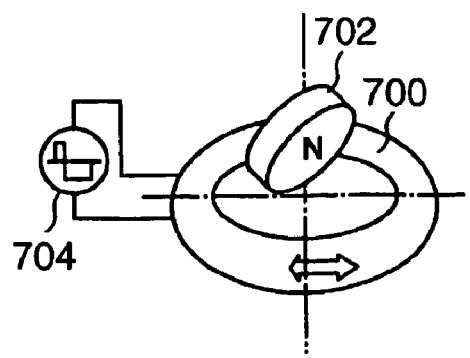

FIG.35
(1)
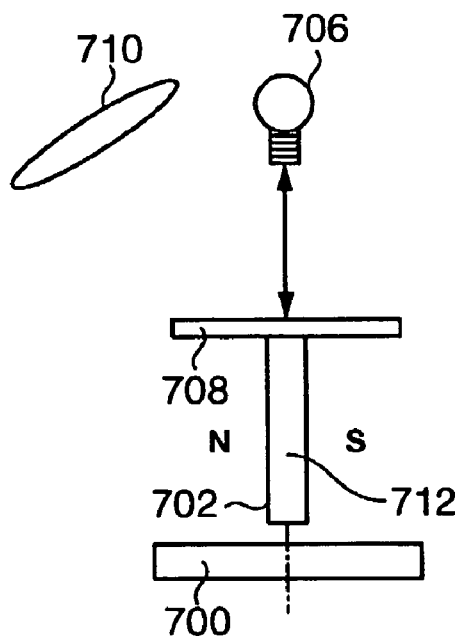
(2)
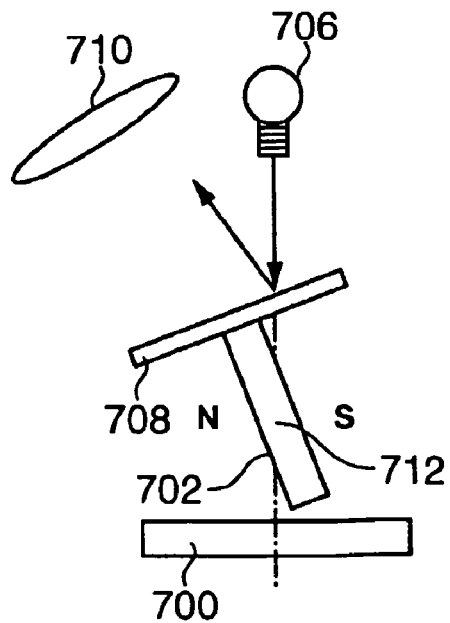

FIG.36
(1)
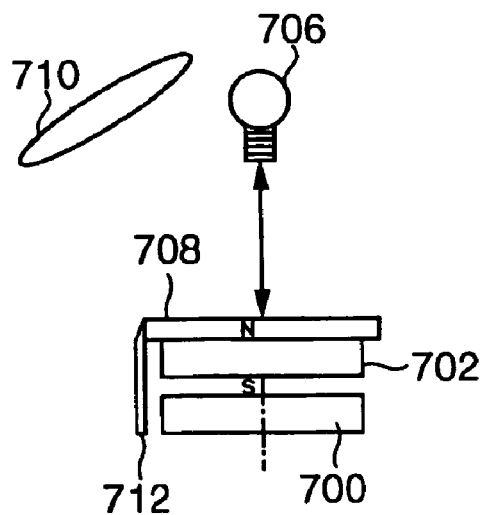
(2)
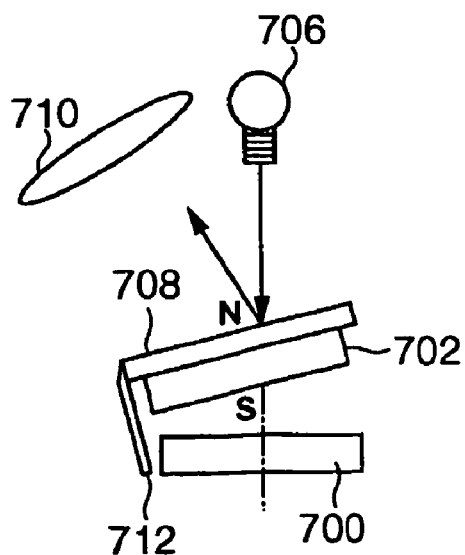

FIG.37
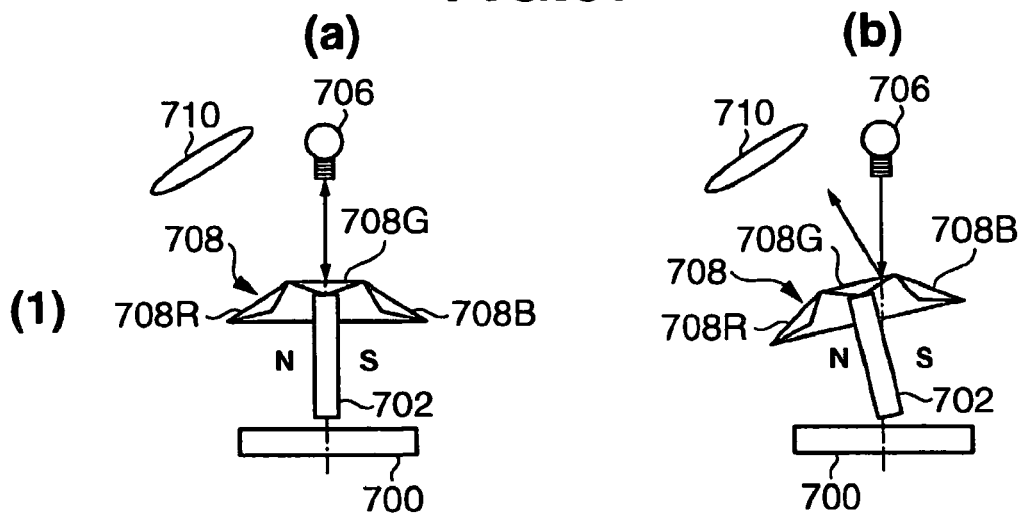
(1)
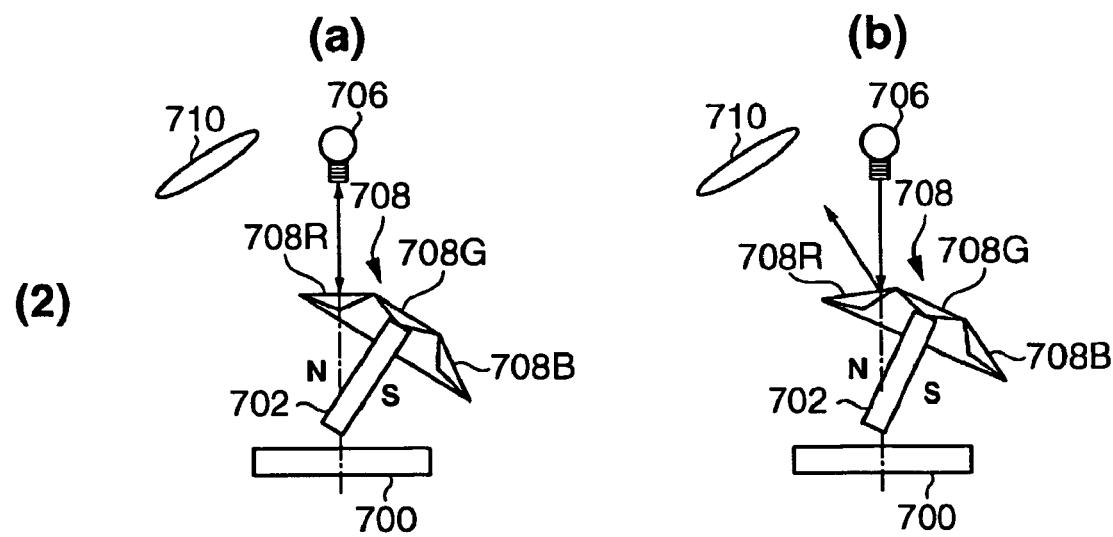
(2)
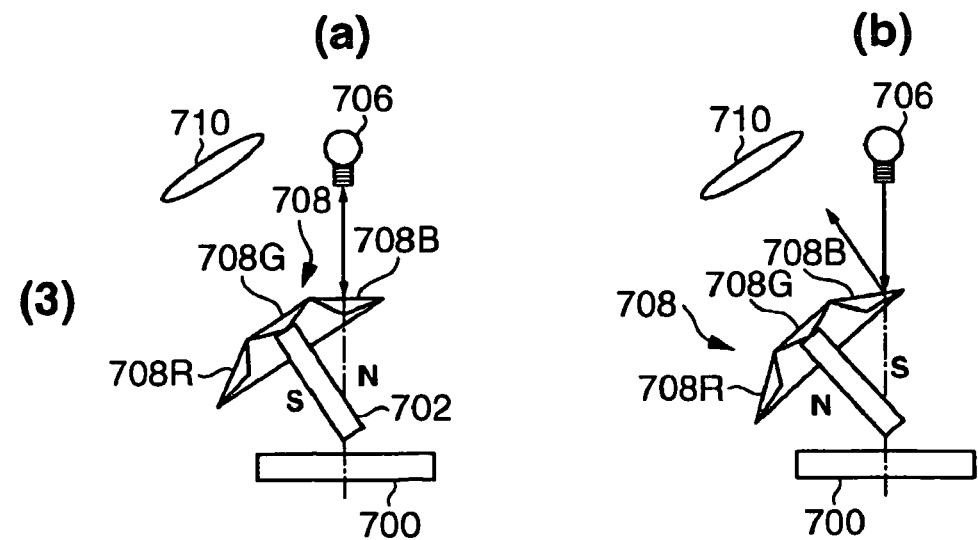
(3)

FIG.38
(A) 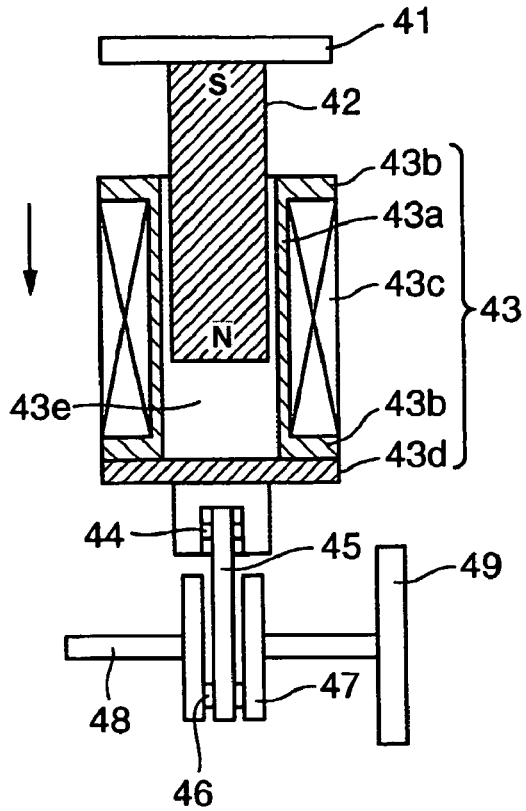
(B) 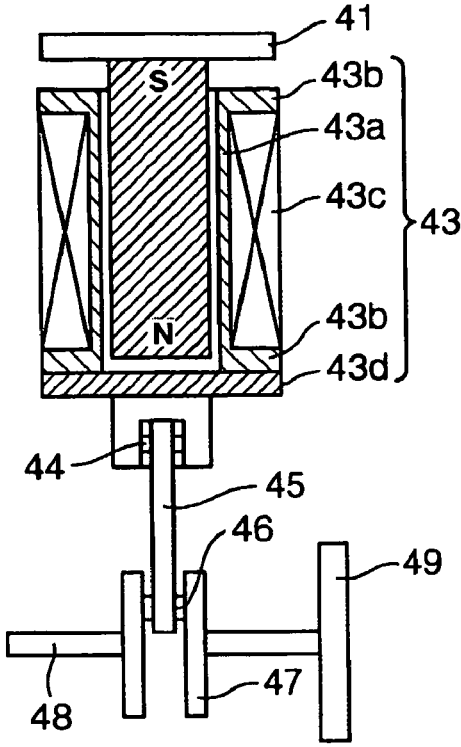
FIG.42
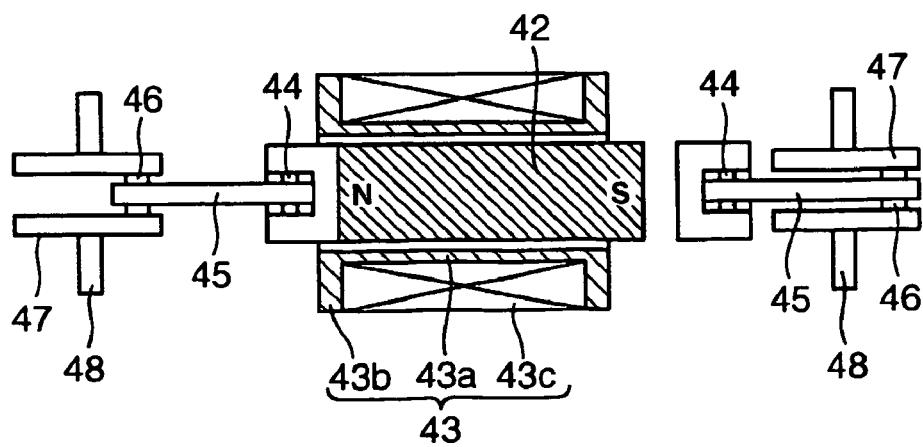

DRIVE MECHANISM

CROSS-REFERENCE TO RELATED APPLICATIONS

This application is a U.S. National Stage (371) of International Application No. PCT/JP2003/012352 filed Sep. 26, 2003, published in English as WO 2004/030407 A2 on Apr. 8, 2004, which claims the benefit of Japanese application numbers 2002-281843, filed Sep. 26, 2002, 2002-357156, filed Dec. 9, 2002, 2003-002562, filed Jan. 8, 2002, 2003-014026, filed Jan. 22, 2003 and 2003-037147, filed Feb. 14, 2003. The disclosures of the above applications are incorporated herein by reference.

DETAILED DESCRIPTION OF THE INVENTION

1. Technical Field of the Invention

The present invention pertains to a drive mechanism and drive unit, and in particular to a drive unit structured from a plurality of magnetic materials. Particularly, the present invention relates to a drive mechanism which oscillates a magnetic body and utilizes this as the driving source by adding repulsion or attraction between the magnetic bodies. More particularly, the present invention pertains to an inductive acoustic conversion device, and in particular to a speaker known as a flat speaker or panel speaker. As this flat speaker can be used in sound source generators, portable audio equipment, electronic newspaper audio equipment, PDA audio equipment, underwater audio equipment and supersonic generators, and since it is thin, light and produces high-quality sound, this flat speaker may be disposed as a part of the display face of various display equipment such as a liquid crystal display apparatus and the like.

More particularly, the present invention pertains to a digital micro mirror device, and in particular to a drive mechanism for inclining the micro mirror. More particularly, the present invention relates to a drive mechanism in which the combination of magnetic bodies is used as the driving source, and the drive circuit performs PWM control on the driving source. More particularly, the present invention pertains to a power output device for rotationally driving the rotational axis by converting electrical energy into kinetic energy, and in particular to improved technology suitable in high outputs of running torque.

2. Description of the Background Art

Conventionally, as a method of generating oscillation by driving a device, known is a vibrating motor employing a disproportionate weight balancer. With this type of vibrating motor, both ends of the rotational axis of the coil are fixed to a housing via a bearing. A weight balancer is mounted on one end of the rotational axis. Since this weight balancer is mounted by being decentered from the rotational axis, the rotational axis oscillates disproportionately in relation to the rotation of the coil, and such oscillation is conveyed to the housing via the bearing.

Moreover, in recent years, with portable terminal apparatuses, beeping and vibration are respectively prepared as means for notifying an incoming call (for instance, please refer to Patent Document 1). In this type of portable terminal apparatus, mounted are a speaker for generating beeps and sounds, and a vibrating motor for generating a call vibration, respectively. The user may suitably selecting such beeping or vibration in accordance with the peripheral circumstance.

Further, as a representative example of a drive mechanism, for instance, there are internal combustion engines and electric motors. The driving force from the driving source will be supplied to a drivee via a transfer mechanism. As this type of driving source, for example, there is a crank mechanism and cam mechanism.

There seems to be no conventional example of employing oscillation of the magnetic body as the driving source. For example, Japanese Patent Laid-Open Publication No. 2000-166174 describes an oscillation generation device for reducing the variation in the sensed oscillation. This oscillation generation device is equipped with an oscillating body and a magnetic field generation device, and the magnetic field generation device is structured from a magnetic field generation unit for generating a magnetic field based on the applied voltage, and a voltage application unit for applying voltage to the magnetic filed generation unit. The oscillation body is structured from a fulcrum unit, and a pair of magnetic oscillation units provided to both ends of the fulcrum unit. The pair of magnetic oscillation units moves with the fulcrum unit as the axis in response to the magnetic field generated with the magnetic field generation unit.

In addition, a DM flat speaker has been conventionally known. This flat speaker comprises an exciter structured from a magnetic circuit and a voice coil, and an oscillation material (diaphragm) excited with this exciter. This speaker does not reciprocate the oscillation material back and forth as a rigid body as with a cone-shaped speaker, but is structured to conduct flexible oscillation in which the resonance point is moved in accordance with the frequency. In other words, DM is an abbreviation for Distributed Mode, and is a method of creating sound by generating distributed oscillation by exciting prescribed locations as a result of freely controlling the resonance mode (bending wave).

As this type of speaker, for instance, a speaker exists as described in the Furukawa Review (June 2001/Development of Flat Speaker Oscillation Film). This flat speaker has a structure in which permanent magnets are disposed, with the N pole and S pole alternating, to a planar yoke as the outer frame, and an oscillating film having a voice coil pattern formed with a flexible print circuit is flexibly supported by the edge at a prescribed distance from the polar face of the permanent magnet.

Moreover, a flat speaker also exists in which the oscillation film is formed from a film, and a voice coil pattern is formed within this oscillation film. Further, Japanese Patent Laid-Open Publication No. 2001-333493 discloses a flat speaker in which the oscillating face is structured from a macromolecular film such as polyamide, and the conductive coil is formed in a flat vortical shape by etching the Cu thin film spread on the oscillating face.

When a sound current of an electronic signal flows to the voice coil, driving force is generated to the voice coil in accordance with the principle of the electromagnetic effect, and the direction of the driving force will be in accordance with Flemming's left-hand rule. The oscillating film in which the voice coil is formed on its entire face conducts piston motion in proportion to the current change flowing to the circuit, air is oscillated, and sound pressure is generated thereby.

Further, a digital micro mirror device (hereinafter sometimes abbreviated as "DMD") is a reflective device structured from an SRAM and several ten thousand micro mirrors. By conducting on/off switching for each mirror at an angle of ±10 degrees, the reflecting direction of the light on the device surface can be switched, and, by adjusting the time of reflection, a gray scale of 256 tones in the respective colors of RBG is realized.

When light hits the micro mirror, light reflected on the mirror at −10 degrees is absorbed with the light absorption plate (off: turns black), and light reflected on the mirror at +10 (on) degrees is projected on a screen as an image via the projection lens.

Density representation is conducted by adjusting the number of on/off (ratio in the number of black and light). With DMD, mirrors are turned off and on at ±10 degrees at high speeds (several thousand times/second) in accordance with the delivered image code. When light from the lamp is placed on the DMD via R (red), G (green) and B (blue) color filters, the light reflected on the mirror passes through the lens and is projected on a screen. In other words, each mirror is a pixel, and composes the image. Spacing between the mirrors is extremely narrow, and, since they move at high speeds, smooth and flowing images are projected on the screen. In addition, according to this digital micro mirror device, there are no electrode units as seen in liquid crystal transparent systems, and, since the entire device surface is reflected, a smooth and seamless screen can be realized.

As this kind of digital micro mirror device, for instance, there exists a type as described in Japanese Patent Laid-Open Publication No. H7-306368 (Patent Document 2). A plurality of micro mirror elements is arranged to form this digital micro mirror device, and each micro mirror element comprises one micro mirror unit, and one position control means provided in correspondence thereto for controlling the position of this micro mirror unit. The micro mirror unit comprises a permanent magnet. Meanwhile, the position control means is formed from one type of electromagnet, and one end thereof is connected to a transistor element. The micro mirror unit position is controlled with the electromagnetic force generated by the position control means as a result of controlling the transistor element. Through the on/off control of the transistor element, current is applied to the position control means, and the micro mirror unit position is controlled upon utilizing the attraction/repulsion generated between the permanent magnet 42 provided to the micro mirror unit by the electromagnetic force generated with the position control means.

Moreover, as a power output device which rotationally drives the rotational axis by converting electrical energy into kinetic energy, for instance, a switched reluctance motor as disclosed in Japanese Patent Laid-Open Publication No. H10-174331 (Patent Document 3) is known. A switched reluctance motor has a circular stator having a plurality of salient poles along the inner peripheral edge thereof, and a plurality of salient poles formed to face the foregoing salient poles in the outer peripheral edge, and is a type of inductive-synchronization motor structured from a rotor axially supported in a rotatable manner within the circular stator. By sequentially exciting the salient poles of the stator for each phase, a magnetic flux is generated in the hollow portion inside the starter, and rotating torque can thereby be provided to the rotor with the magnetic force arising between the salient pole of the rotor and the salient pole of the stator.

Nevertheless, since a speaker and vibrating motor are respectively mounted in the foregoing portable terminal apparatus, mounting procedures for the respective items are necessary, and this hindered the realization of miniaturization and weight saving of the portable terminal apparatus. Further, as described above, when a vibrating motor is used, since the structure employed a disproportionate weight balancer, significant stress was generated in the rotational axis and bearing, and, as a result, there is a problem in that the life duration of the vibrating motor will shorten. Moreover, with the conventional technology described above, there is no disclosure or suggestion of driving the drivee by employing the oscillation of the magnetic body as the driving source.

In addition, according to the conventional flat speaker described above, since a diaphragm containing a conductive material is oscillated, a plurality of coils and a permanent magnet are necessary in the structure. Further, when the diaphragm contains a magnetic coil, the conductive material oscillates in addition to the diaphragm, and the oscillation within the diaphragm will vary, and conversions corresponding to low frequencies will also become difficult. And, since a certain amount of space is required between the permanent magnet and the coil in order to enable the oscillation of the diaphragm, there is an additional problem in that the magnetic efficiency will deteriorate.

Moreover, in the conventional examples relating to conventional micro mirrors, when the transistor element is in an off state, current does not flow to the position control means connected to the transistor element, electromagnetic force is not generated in the electromagnet, and, light emitted from the micro mirror unit by the attraction working between the permanent magnet provided to the micro mirror unit and this electromagnet will be shielded with a shield having an opening provided between the digital micro mirror device and the screen, and the light will not reach the screen. Nevertheless, in this state, since electricity is not provided to the electromagnet, there is a problem in that the behavior of the micro mirror will be unstable. Further, there is an additional problem in that the displacement of the micro mirror cannot be controlled in an analog manner.

However, with this type of electric motor, there is a structural limitation in the high output of rotating torque even upon increasing the number of phases or increasing the value of the excitation current, and development of improved technology is desirable.

Thus, an object of the present invention is to provide a drive mechanism employing a magnetic body as the driving source for driving the drivee by controlling the polarity of the signal supplied to the magnetic body. Another object of the present invention is to provide a drive unit comprising both an oscillation generation function and sound generation function. A further object of the present invention is to provide a drive unit capable of generation oscillation without locally burdening the device.

Yet another object of the present invention is to provide an inductive acoustic conversion device having a simple magnetic body structure, wherewith the oscillation within the oscillation material will not vary, superior in frequency characteristics in low frequency domains, and further superior in magnetic efficiency.

Still another object of the present invention is to provide a drive mechanism of a micro mirror in a digital micro mirror device capable of stabilizing the displacement behavior of the micro mirror in a digital micro mirror device, and changing such displacement in an analog manner. Still another object of the present invention is to provide, in a drive mechanism in which a set formed from a plurality of magnetic bodies is employed as the driving source, a drive mechanism of a drivee utilizing PWM control of a frequency signal, and a display apparatus comprising such a drive mechanism.

Still another object of the present invention is to provide a power output device capable of realizing high output of the rotating torque. Still another object of the present invention is to provide a power output device capable of realizing a stable rotational drive.

Means for Solving the Problems

In order to achieve the foregoing objects, the present invention is a drive mechanism, comprising: a set comprising a plurality of magnetic bodies; means for supplying a frequency signal to the set; and means for producing movement caused by the attraction/repulsion between the magnetic bodies; wherein the movement is the driving source of the drive mechanism.

The first mode of the present invention is a drive unit, comprising: a first magnetic material and a second magnetic material, in which one magnetic material is provided to the fixed side and the other magnetic material is provided on the drive side; and drive means for driving the magnetic material on the driving side against the magnetic material on the fixed side by generating a magnetic action between the first magnetic material and the second magnetic material as a result of providing a frequency signal to the first magnetic material or second magnetic material; wherein one magnetic material is disposed such that the direction above the magnetic line it generates intersects or is parallel with the direction above the magnetic line generated by the other magnetic material, or a method of controlling such a drive unit.

Another mode of the present invention is a drive mechanism, comprising: a plurality of magnetic bodies disposed facing each other; and a drive circuit for applying a polar signal which generates force for mutual repulsion or attraction between the magnetic bodies; wherein a set formed of the plurality of magnetic bodies is supported with a fulcrum, and the drive circuit drives the magnetic body around the fulcrum in an inclining manner; and the set of magnetic bodies is structured as the driving source by being connected to a drivee.

Another mode of the present invention relates to a magnetic field control mechanism and a drive mechanism employing such a magnetic field control mechanism; that is, another mode of the present invention is a drive mechanism, comprising: a plurality of magnetic field generation means; means for making the magnetic fields generated by the magnetic field generation means mutually interfere; and a drive to be driven with at least one behavior of the plurality of magnetic field generation means.

As explained in the embodiments described later, the magnetic field generation means is a unit of a permanent magnet and an electromagnetic coil (induced magnetic field generation means), or a unit of electromagnetic coils. The drive mechanism is provided with one or a plurality of such units. The interference means is for supplying a frequency signal to the coil, and various control such as the PLL control or PWM control of the frequency signal may be employed.

Another mode of the present invention is an acoustic conversion device, wherein a plurality of magnetic bodies is disposed to face each other in a plane, the magnetic bodies are oscillated relatively, at least one magnetic body is structured from a voice coil and an oscillation material, the voice coil exists outside the oscillation area of the oscillation material, and further comprising a drive circuit for supplying a drive signal to the voice coil.

Another mode of the present invention is a drive mechanism of a micro mirror in a digital micro mirror device, comprising: a micro mirror support mechanism; and a drive circuit for supplying a drive signal to the support mechanism; wherein the support mechanism comprises a set formed from a plurality of magnetic bodies, the drive circuit supplies a frequency signal to at least one of the magnetic bodies, and the support mechanism inclines the micro mirror by making the magnetic fields from the magnetic bodies interfere with each other.

Another mode of the present invention is a drive mechanism employing a set formed from a plurality of magnetic bodies as the driving source comprising a drive circuit, wherein a drive signal composed of a frequency signal from the drive circuit is supplied to at least one of the magnetic bodies, the magnetic bodies are made to incline between the magnetic bodies by generating interference in the magnetic field between the magnetic bodies, the drive circuit is capable of providing a duty ratio of the drive signal by comprising PWM control means and controlling the inclination of the magnetic body with the duty ratio, and this inclination is employed as the drive of a drivee.

A further specific mode of the present invention is a power output device, comprising: a hollow cylindrical body to which a coil is wound; a pillar-shaped permanent magnet inserted into the hollow portion of the hollow cylindrical body; and a crank mechanism for converting the relative reciprocating motion of the hollow cylindrical body and the permanent magnet to a rotational motion of a rotational axis; wherein the hollow cylindrical body forms a magnetic circuit between the permanent magnet inserted in the hollow portion thereof with the drive pulse signal supplied to the coil, alternately generates magnetic repulsion and magnetic attraction between the hollow cylindrical body and the permanent magnet in accordance with the polarity of the alternately changing drive pulse signal, and thereby makes the hollow cylindrical body and the permanent magnet conduct a reciprocating motion, and coverts the reciprocating motion into a rotational motion of a rotational axis via the crank mechanism. According to the foregoing structure, since the hollow cylindrical body and permanent magnet conduct a relative reciprocating motion in the vector direction of the magnetic repulsion and magnetic attraction working between the hollow cylindrical body and permanent magnet, electrical energy can be efficiently converted to reciprocating motion, and, since this reciprocating motion is converted into a rotational motion of the rotational axis via a crank mechanism, high power rotating torque is realized thereby. Further, since a magnetic circuit is formed between the two in a state where the permanent magnet is inserted inside the hollow portion of the hollow cylindrical body, magnetic repulsion and magnetic attraction can be increased relatively largely.

BRIEF DESCRIPTION OF THE DRAWINGS

FIG. 1 is a diagram showing the structure of the drive unit pertaining to Embodiment 1.

FIG. 7 is a top view of the drive unit pertaining to Embodiment 5.

FIG. 8 is a top view of the drive unit pertaining to Embodiment 6.

FIG. 11 is a view showing a frame format of the drive mechanism pertaining to Embodiment 7.

FIG. 12 is a view showing a frame format of the drive mechanism pertaining to Embodiment 8.

FIG. 13 is a view showing a frame format of the drive mechanism pertaining to Embodiment 9.

FIG. 14 is a view showing a frame format of the drive mechanism.

FIG. 15 is a view showing a frame format of the drive unit pertaining to Embodiment 10.

FIG. 16 is a view showing a frame format of the drive mechanism.

FIG. 17 is a view showing a frame format of the drive mechanism.

FIG. 34 is a view showing the principle of operation for realizing the drive mechanism of the present invention.

FIG. 35 is a view showing a frame format of the operation of the drive mechanism of the micro mirror element.

FIG. 36 is a view showing a frame format of the operation of the drive mechanism of another micro mirror element.

FIG. 37 is a view showing a frame format of the operation pertaining to another Embodiment of the drive mechanism of the micro mirror element.

FIG. 38 is a structural diagram of the drive system of the power output device pertaining to the present embodiment.

FIG. 40 is a timing chart of the control signal.

BEST MODE FOR CARRYING OUT THE INVENTION

Embodiment 1

Next, Embodiment 1 of the present invention is described with reference to the drawings. Incidentally, the first magnetic material corresponds to a coil, and the second magnetic material corresponds to a permanent magnet.

Figure 2:
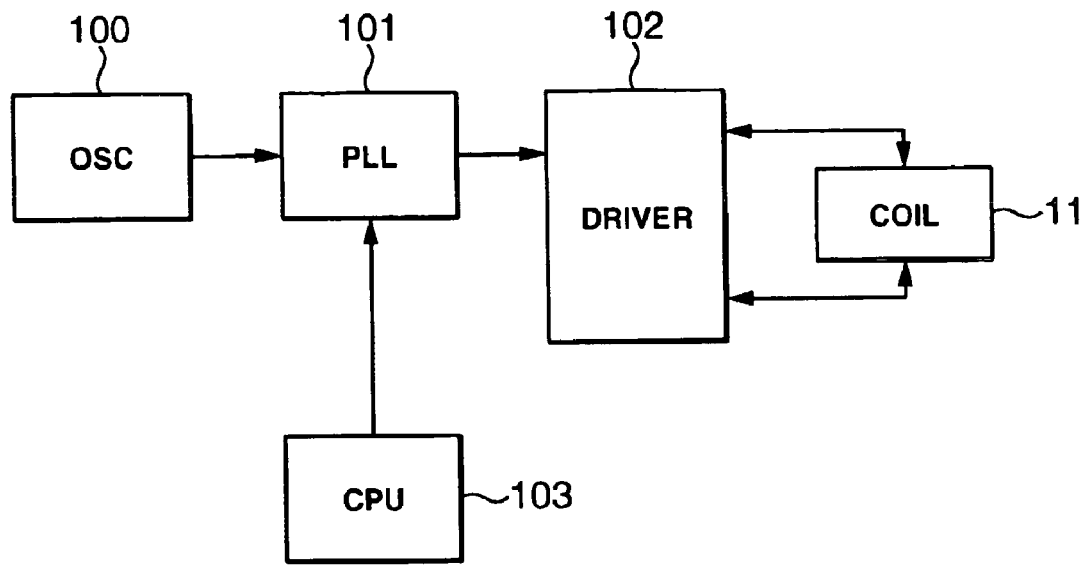
FIG. 2 is a structural diagram of the circuit for driving the drive unit shown in FIG. 1.
Figure 3:
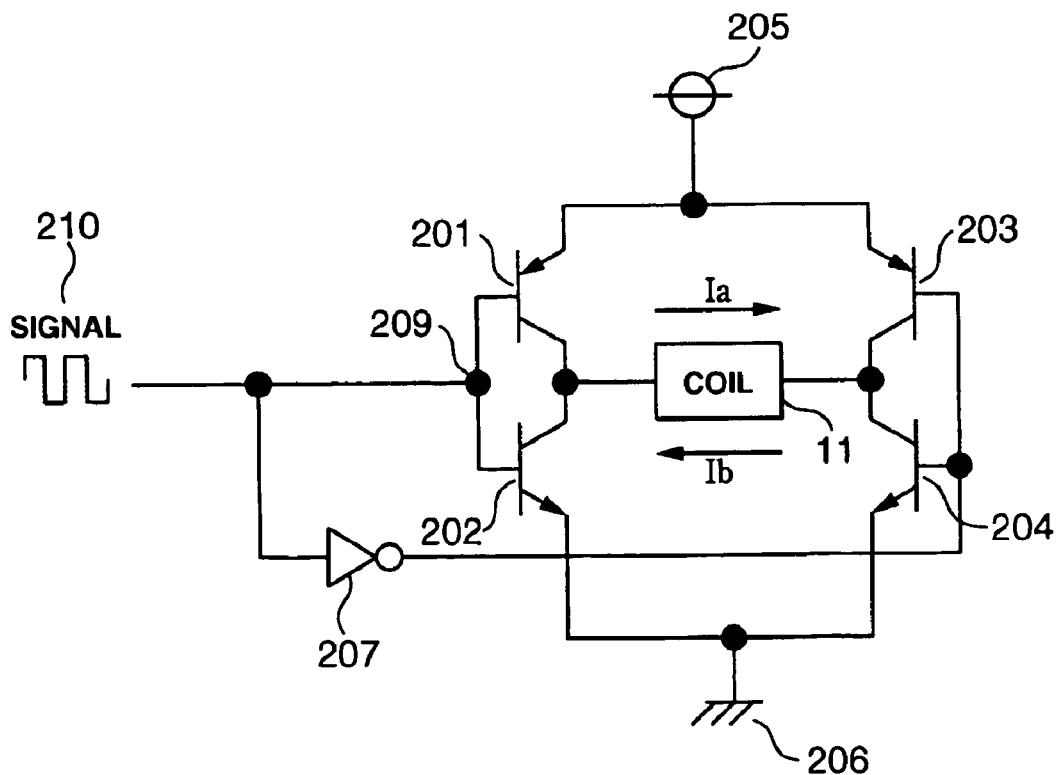
FIG. 3 is a structural diagram of the circuit for driving the coil shown in FIG. 1.

Foremost, the drive unit pertaining to Embodiment 1 of the present is explained. FIG. 1 is a diagram showing the structure of the drive unit pertaining to Embodiment 1, and FIG. 1(A) is a top view, and FIG. 1(B) is the B-B cross section of FIG. 1(A). FIG. 2 is a circuit structure diagram of the drive unit shown in FIG. 1. FIG. 3 is a circuit structure diagram for driving the coil shown in FIG. 1.

In FIG. 1(A), the drive unit 1 comprises a substrate 10, a coil 11 for generating magnetism, a permanent magnet 12, and a drive circuit 13 for driving the coil 11. With the coil 11 as the fixed part, one face thereof is mounted on and fixed to the substrate 10. With the permanent magnet 12 as the transducer, one end thereof is retained with a cover as the resonant plate such that it is positioned in the hollow portion 11a of the coil 11. Moreover, FIG. 1(A) is indicated upon removing the cover 15 shown in FIG. 1(B) so that the inside of the drive unit 1 is visible.

As shown in FIG. 1(B), the drive unit 1 comprises a substrate 10, and a cover 15 provided to a position facing such substrate 10. This cover 15 is structured to form a prescribed case together with the substrate 10. The coil 11, which structures the magnetic circuit, is fixed to the substrate 10 structuring the bottom face of the case. And, with the permanent magnet 12, one end thereof is mounted oscillatably against the cover 15 via a buffering holder 14 such that the other can be inserted into the hollow portion 11a demarcating the inner peripheral shape of the coil 11. In other words, one longitudinal end of the permanent magnet 12 having an approximate rectangular shape is positioned at the hollow portion 11a of the coil 11, and the other longitudinal end of the permanent magnet 12 is mounted oscillatably to the buffering holder 14.

The buffering holder 14 is fixed at a position of the cover 15 facing the hollow portion 11a of the coil 11. Further, the permanent magnet 12 has an S pole and N pole, respectively, at both ends parallel to the longitudinal direction, and the respective polar faces are disposed so as to face the inner periphery of the coil 11. That is, the permanent magnet 12 is disposed such that the direction above the magnetic line generated by the permanent magnet 12 intersects with the magnetic line generated by the coil 11. Moreover, in FIG. 1, although the direction above the magnetic line generated by the permanent magnet 12 is disposed so as to intersect at an inclination of 90 degrees, this inclination is not limited to 90 degrees.

Incidentally, in FIG. 1(B), the portion from the approximate longitudinal center of the permanent magnet 12 to one longitudinal end is disposed and positioned at the hollow portion 11a of the coil 11. Nevertheless, one longitudinal end of the permanent magnet 12 may be disposed and positioned at the upper part of the hollow portion 11a of the coil 11 (such that the permanent magnet 12 will be positioned outside the coil 11 in its entirety). In addition, the shape, material and mass of the permanent magnet as the transducer may be suitably selected in accordance with the required specification. Further, although silicon or the like would correspond to the material of the buffering holder, this may also be suitably selected in accordance with the required specification.

In FIG. 2, the drive circuit of the drive unit is structured from an OSC (oscillator) 100, a PLL (Phase Locked Loop) 101, a driver 102, a coil 11, and a CPU (Central Processing Unit) 103. The PLL 101 as the frequency control means for controlling the frequency of the drive current to be input to the coil 11 outputs a prescribed frequency in accordance with the control of the CPU 103. When the drive unit 1 is employed in a portable terminal apparatus, it outputs a prescribed frequency based on the user's setting. For instance, when the user is setting a vibrating sound as the method of receiving incoming calls, the CPU 103 controls the PLL 101 such that a low frequency signal is output in correspondence with the call vibration. Further, when the user is setting a beeping sound as the method of receiving incoming calls, the CPU 103 controls the PLL 101 such that a high frequency signal is output in correspondence with the beeping sound. The low frequency (oscillation frequency) domain is set to 4 Hz to 30 Hz, and the high frequency domain is set to 400 Hz to 40 KHz.

In FIG. 3, the coil operates upon the drive signal generated with the drive circuit shown in FIG. 2 being input to the coil. The circuit for driving the coil of the drive unit 1 is structured with a pair of PNP transistors 201, 203 and NPN transistors 202, 204 in cross multiplication. The coil 11 is connected between a collector of the transistor 201 and transistor 202, and a collector of the transistor 203 and transistor 204, and an input connection point 209 is formed between a base of the transistor 201 and transistor 202 and a base of the transistor 203 and transistor 204 by being connected via the inverter 207. A power supply voltage 205 is connected to the emitter of the transistor 201 and transistor 203, and a ground 206 is connected to an emitter of the transistor 202 and transistor 204. An excitation signal 210 flows alternately in the direction of arrow 1a or 1b, and, in the case of a low frequency, for instance, a signal of 4 Hz to 30 Hz is input and, in the case of a high frequency, for instance, a signal of 400 Hz to 40 Khz is input, respectively. Incidentally, when employing the drive unit shown in FIG. 7 and FIG. 8 described later, it is desirable that 0.1 Hz to 30 Hz is set as the low frequency, and 400 Hz to 40 KHz is set as the high frequency.

Returning to FIG. 1, the basic operation of the drive unit 1 structured as described above is now explained. With the drive unit 1, when the drive circuit 13 applies a drive current (alternating current) to the coil 11, magnetic attraction and repulsion are mutually repeated between the coil 11 and the permanent magnet 12. In other words, as a result of the current applied to the coil 11 and the magnetic action of the permanent magnet 12, the permanent magnet 12 oscillates in the polar direction with the portion retained by the buffering holder 14 as the fulcrum.

Specifically, when the drive circuit 13 applies to the coil 11 a drive current of a low frequency domain; that is, a frequency domain (mechanical oscillation frequency) lower than the audio frequency domain described later, the permanent magnet 12 oscillates, and the oscillation of this permanent magnet 12 is conveyed to the buffering holder 14 retaining the permanent magnet 12. As a result, the permanent magnet 12 and the buffering holder 14 oscillate as one, and, when the oscillation increases, the generated oscillation is conveyed outside via the cover 15. Meanwhile, with the drive unit 1, when the drive circuit 13 applies to the coil 11 a drive current of a high frequency domain; that is, a drive current of an audio frequency domain (for example, the audio frequency domain employed in telephones or the like), sound pressure will be generated by the permanent magnet 12 oscillating in the polar direction, and a prescribed audible sound will be produced.

Therefore, when mounting the drive unit 1 on a portable terminal apparatus, the frequency of the drive signal may be controlled in accordance with the notification conditions of whether to receiving incoming calls with a beeping sound or call vibration. For example, when the user is selecting to receive incoming calls with call vibration (manner mode), the drive circuit 13 applies a drive current of a low frequency domain to the coil 11. As a result, the oscillation of the permanent magnet 12 is conveyed as a call vibration to the housing of the portable terminal apparatus (not shown) via the cover 15, and will notify the user of an incoming call. Meanwhile, when the user is selecting to receive incoming calls with a ring tone (beeping or melody), the drive circuit 13 applies a drive current of a high frequency domain to the coil 11. As a result, sound pressure caused by the oscillation of the permanent magnet 12 is discharged from the air holes of the housing of the portable terminal apparatus, will generate a ring tone, and notify the user of an incoming call. Further, when the user in speaking on the phone, the oscillation of this permanent magnet 12 may be structured such that it becomes the voice of the opponent or the user.

According to the drive unit 1 as described above, both functions of an oscillation generating body and sound producing body can be shared in a single drive unit. Further, since it is only necessary to control the frequency of the drive current of the coil 11, with a simple control structure, a single drive unit may be switched between an oscillation generating source or sound producing source and used. Moreover, a drive unit offering the two operations of sound production and oscillation can be realized with a simple component structure and at a low cost.

In addition, according to the foregoing drive unit 1, since the permanent magnet as the transducer is retained by the buffering holder 14, the drive unit 1 is not locally burdened. Thus, since it is possible to reduce the stress of the mechanical oscillation system in connection with the oscillation, the extension of the life duration of the drive unit can be sought.

Embodiment 2

Figure 4:
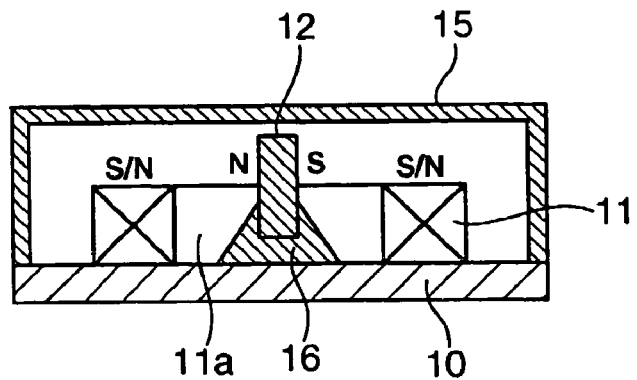
FIG. 4 is a cross section of the drive unit pertaining to Embodiment 2.

Next, the drive unit pertaining to Embodiment 2 of the present invention is explained. FIG. 4 is a cross section of the drive unit pertaining to Embodiment 2. Incidentally, with respect to the structure of the drive unit pertaining to Embodiment 2, points differing from the drive unit pertaining to Embodiment 1 will only be explained, and the structural components that are the same as those of Embodiment 1 are given the same reference numerals.

In FIG. 4, the difference between the drive unit pertaining to Embodiment 2 and the drive unit pertaining to Embodiment 1 is in that the buffering holder 16 retaining the permanent magnet 12, which is a transducer, is provided to the substrate 10 side and not on the cover 15 side of the case. According to this structure, the permanent magnet 12 will oscillate toward the polar direction with the portion retained by the buffering holder 16 provided on the substrate 10 side as the fulcrum.

The operation of the drive unit 1 pertaining to Embodiment 2 is substantially the same as the drive unit 1 pertaining to Embodiment 1, and the detailed description thereof is omitted. Further, when the drive circuit 13 applies a drive current of a low frequency domain to the coil 11, the oscillation of the permanent magnet 12 is conveyed outside via the buffering holder 16 and the substrate 10. Thus, here, the substrate 10 also functions as the diaphragm which resonates with the oscillation of the permanent magnet 12.

With the drive unit pertaining to Embodiment 2, in addition to the effect of the drive unit pertaining to Embodiment 1, since the buffering holder 16 is provided to the substrate 10 side for fixing the coil 11, the housing (substrate 10) can be oscillated directly even when a cover for oscillation is not used to acquire space-saving room. Moreover, since the coil 11 and the permanent magnet 12 can be disposed on the same substrate 10, the number of components for structuring the drive unit 1 can be reduced.

Embodiment 3

Figure 5:
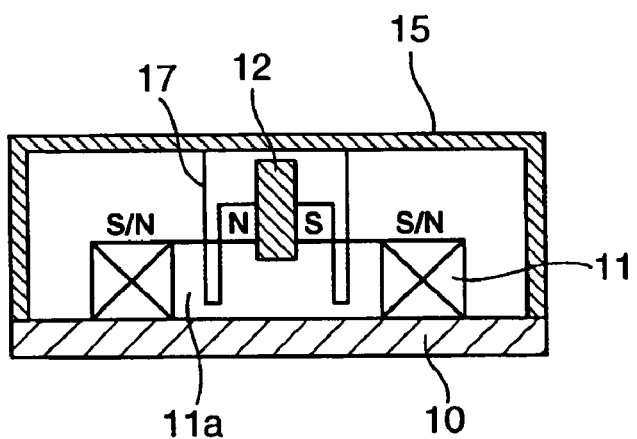
FIG. 5 is a cross section of the drive unit pertaining to Embodiment 3.

Next, the drive unit pertaining to Embodiment 3 of the present invention is explained. FIG. 5 is a cross section of the drive unit pertaining to Embodiment 3. Incidentally, with respect to the structure of the drive unit pertaining to Embodiment 3, points differing from the drive unit pertaining to Embodiment 1 will only be explained, and the structural components that are the same as those of Embodiment 1 are given the same reference numerals.

In FIG. 5, the difference between the drive unit pertaining to Embodiment 3 and the drive unit 1 pertaining to Embodiment 1 is in that the permanent magnet 12 as a transducer is retained with a buffering supporter 17.

The operation of the drive unit 1 pertaining to Embodiment 3 is substantially the same as the drive unit 1 pertaining to Embodiment 1, and the detailed description thereof is omitted. With the drive unit 1 pertaining to Embodiment 3, in addition to the effect of the drive unit 1 pertaining to Embodiment 1, the area of amplitude by vibration can be increased as a result of employing a buffering supporter 17.

Embodiment 4

Figure 6:
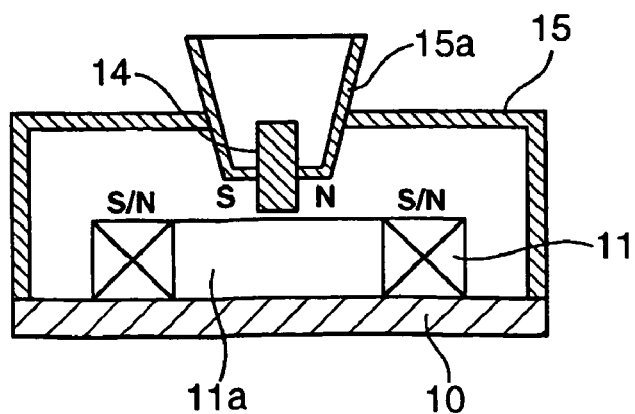
FIG. 6 is a cross section of the drive unit pertaining to Embodiment 4.

Next, the drive unit pertaining to Embodiment 4 of the present invention is explained. FIG. 6 is a cross section of the drive unit pertaining to Embodiment 4. Incidentally, with respect to the structure of the drive unit pertaining to Embodiment 4, points differing from the drive unit pertaining to Embodiment 1 will only be explained, and the structural components that are the same as those of Embodiment 1 are given the same reference numerals.

In FIG. 6, the difference between the drive unit pertaining to Embodiment 4 and the drive unit 1 pertaining to Embodiment 1 is in that a resonance unit 15*a* as a diaphragm having a cylindrical shape is provided to the center of the cover 15, and this resonance unit 15*a* is retaining the permanent magnet 14. Further, in FIG. 6, the permanent magnet 14 is outside the coil 11 in its entirety, and retained so as to be positioned at the upper part of the hollow portion 11*a* of the coil 11.

The operation of the drive unit pertaining to Embodiment 4 is substantially the same as the drive unit pertaining to Embodiment 1, and the detailed description thereof is omitted. Further, when the drive circuit 13 applies a drive current of a low frequency domain to the coil 11, the oscillation of the permanent magnet 14 is conveyed to the resonance unit 15*a*, and the oscillation of the resonance unit 15*a* generates sound pressure.

With the drive unit pertaining to Embodiment 4, in addition to the effect of the drive unit pertaining to Embodiment 1, since a resonance unit 15*a* as a diaphragm having a cylindrical shape has been provided and sound is thereby produced with this resonance unit 15*a*, it is possible to produce sounds of higher quality. Thus, it is possible to improve the high frequency characteristics.

Embodiment 5

Next, the drive unit pertaining to Embodiment 5 of the present invention is explained. FIG. 7 is a top view of the drive unit pertaining to Embodiment 5. The drive unit pertaining to Embodiment 5, for instance, may be employed in robots that walk or fly. Further, FIG. 7(A) shows a state where an excitation signal is not provided to the coil, FIG. 7(B) shows a state where an excitation signal is applied to the coil, and FIG. 7(C) shows a state where an excitation signal opposite to FIG. 7(B), respectively.

In FIG. 7(A), the drive unit 2 comprises a coil 21 as a fixed part for generating magnetism, and a substrate 22 mounted and fixed to the hollow portion of the coil 21 so as to be engaged therewith, and further comprises a permanent magnet 23 (23*a* and 23*b*) as a transducer, and a pole-shaped oscillation member 24 (24*a* and 24*b*) mounted on the permanent magnet 23. Moreover, although not shown, a drive circuit for driving the coil is also provided.

The permanent magnet 23 is formed from a first permanent magnet 23*a* and a second permanent magnet 23*b*, and has an S pole and N pole at the end parallel to the longitudinal direction, respectively. With the first permanent magnet 23*a* and second permanent magnet 23*b*, the one longitudinal end of each of these magnets is mounted oscillatably at a position corresponding to both end faces of the substrate 22. The location of mounting one longitudinal end may be anywhere on both end faces of the substrate 22, but in the present embodiment, such longitudinal end is mounted at the center of both end faces; that is, at a position corresponding to the center of the inner periphery of the coil 21. Moreover, with the first permanent magnet 23*a* and second permanent magnet 23*b*, differing magnetic poles are retained such that they sandwich the substrate 22 and face each other. In addition, with the first permanent magnet 23*a* and second permanent magnet 23*b*, pole-shaped oscillation members 24*a* and 24*b* are mounted on the other longitudinal ends of the respective magnets. The pole-shaped oscillation members 24*a* and 24*b* are formed, for instance, with a light and firm material such as plastic, and are structured to resonate with the oscillation of the permanent magnet 23.

Next, the basic operation of the drive unit 2 structured as described above is explained. In FIG. 7(B), when the drive circuit not shown applies a drive current to the coil 21, magnetic flux is generated to the coil 21. Here, since excitation is applied such that an S pole is generated on the first permanent magnet 23*a* side and an N pole is generated on the second permanent magnet 23*b* side, the first permanent magnet 23*a* and the second permanent magnet 23*b* move in the direction of arrow m.

Next, as shown in FIG. 7(C), when excitation is applied such that an N pole is generated on the first permanent magnet 23*a* side and an S pole is generated on the second permanent magnet 23*b* side, the first permanent magnet 23*a* and the second permanent magnet 23*b* move in the direction of arrow n. Thus, when the drive circuit applies a drive current such that the magnetic flux of the coil 21 is switched, the first permanent magnet 23*a* and second permanent magnet 23*b* repeat movement toward the same direction in accordance with the direction of the drive current.

Here, when the drive circuit applies a drive current of a low frequency domain to the coil 21, the first permanent magnet 23*a* and second permanent magnet 23*b* respectively oscillate, and the permanent magnet 23 and the oscillation member 24 fixed to such permanent magnet 23 oscillate as one. Thus, for example, when the drive unit 2 is employed as a robot in the form of an insect, the oscillation of the oscillation member 24 may be utilized in the walking motion of the insect.

Meanwhile, with the drive unit 2, when the drive circuit applies a drive current of a high frequency domain to the coil 21, sound pressure is generated with the oscillation of the permanent magnet 23 and oscillation member 24, and a prescribed audible sound can be produced thereby. Thus, when the drive unit is employed as a robot in the form of an insect, a prescribed audible sound may be structured to be a desired "chirping of insects" generated by insects rubbing their wings.

According to this kind of drive unit 2, since an oscillation device capable of serving both as the source for generating oscillation and generating a sound source may be applied in the field of robots of insects or the like, the seasoning of insect robots can be improved even further. Moreover, as a result of structuring the oscillation member 24 in a thin and light wing shape, this may also be applied in insect robots that fly such as a dragonfly, or applied as an ecological actuator in the natural world of fishes, leaves of plants and so on.

Moreover, similar effects can be yielded even upon making the coil 21 a permanent magnet, or making the permanent magnets 23A, 23B a coil magnet.

The drive circuit of the drive device of this embodiment is structured similar to those illustrated in FIG. 2 and FIG. 3. The PLL 101 as the frequency control means for controlling the frequency of the drive current to be input to the coil 21 supplies a drive signal of a prescribed frequency to the driver 102 in accordance with the control of the CPU 103. The low frequency (oscillation frequency) domain is set to 0.1 Hz to 30 Hz, and the high frequency domain is set to 400 Hz to 40 KHz. An excitation signal 210 flows alternately in the direction of arrow 1a or 1b, and, in the case of a low frequency, for instance, a signal of 4 Hz to 30 Hz is input and, in the case of a high frequency, for instance, a signal of 400 Hz to 40 Khz is input, respectively. As a result of the current applied to the coil 21 and the magnetic action of the permanent magnet, the permanent magnet oscillates or reciprocates in accordance with the circular path in the direction of arrow m, n shown in the diagram according to the magnetic attraction and repulsion with portions 25a, 25b of the substrate 22 as the fulcrum. Therefore, the oscillation members 24a, 24, which are drivers, can be driven with the oscillation of the magnetic body.

Returning to FIG. 7, the basic operation of the drive unit 2 structured as described above is now explained. With the drive unit 2, when the drive circuit (c.f. FIG. 2) applies a drive current (alternating current) to the coil 21, magnetic attraction and repulsion are mutually repeated between the coil 21 and the permanent magnet 23a, 23b. In other words, as a result of the current applied to the coil 21 and the magnetic action of the permanent magnet, the permanent magnet oscillates or reciprocates in accordance with the circular path in the direction of arrow m, n shown in FIG. 11 according to the magnetic attraction and repulsion with portions 25a, 25b of the substrate 22 as the fulcrum. Therefore, the oscillation members 24a, 24, which are drivees, can be driven with the oscillation of the magnetic body.

Embodiment 6

Next, the drive unit pertaining to Embodiment 6 of the present invention is explained. FIG. 8 is a top view of the drive unit pertaining to Embodiment 6. Incidentally, with respect to the structure of the drive unit pertaining to Embodiment 6, points differing from the drive unit pertaining to Embodiment 5 will only be explained, and the structural components that are the same as those of Embodiment 5 are given the same reference numerals.

In FIG. 8, the difference between the drive unit pertaining to Embodiment 6 and the drive unit pertaining to Embodiment 5 is in that an electromagnet is used in place of a permanent magnet. The basic operation of the drive unit as structured above is now explained. Here, in conjunction with the excitation to the coil 21, a more complex control is enabled by controlling the electromagnet so as to change the polarity of the electromagnet.

With FIG. 8(B), when excitation is applied such that an S pole is generated on the first electromagnet 23a side and an N pole is generated on the second electromagnet 23b side, a drive current is applied to the first electromagnet 23a so as to change the polarity of the first electromagnet 23a. Thereby, although the first electromagnet 23a moves in the direction of arrow m, the second electromagnet 23b will move in the direction of arrow n, and, therefore, the first electromagnet 23a and the second electromagnet 23b will move in different directions, respectively.

Next, as shown in FIG. 8(C), when excitation is applied such that an N pole is generated on the first electromagnet 23a side and an S pole is generated on the second electromagnet 23b side, the first electromagnet 23a moves in the direction of arrow n, but the second electromagnet 23b moves in the direction of arrow m, and the first electromagnet 23a and second electromagnet 23b will move in different directions.

According to the above, as a result of controlling the polarity of the first electromagnet 23a and second electromagnet 23b, the moving direction of the first electromagnet 23a and second electromagnet 23b can be suitably controlled to move in the same direction or different directions.

As described above, with the drive unit pertaining to Embodiment 6, in addition to the effect of the drive unit pertaining to Embodiment 5, since an electromagnet is employed in place of a permanent magnet, when the drive unit 2 is applied to a robot in the form of insects, it will be possible to realize a more complex walking movement. Further, by structuring the oscillation member 24 in a thin and light wing shape and employing this in insect robots that fly such as a dragonfly, it will be possible to realize a stable flight by controlling the insect robot to change its flight path in accordance with the air current during the flight.

Figure 9:
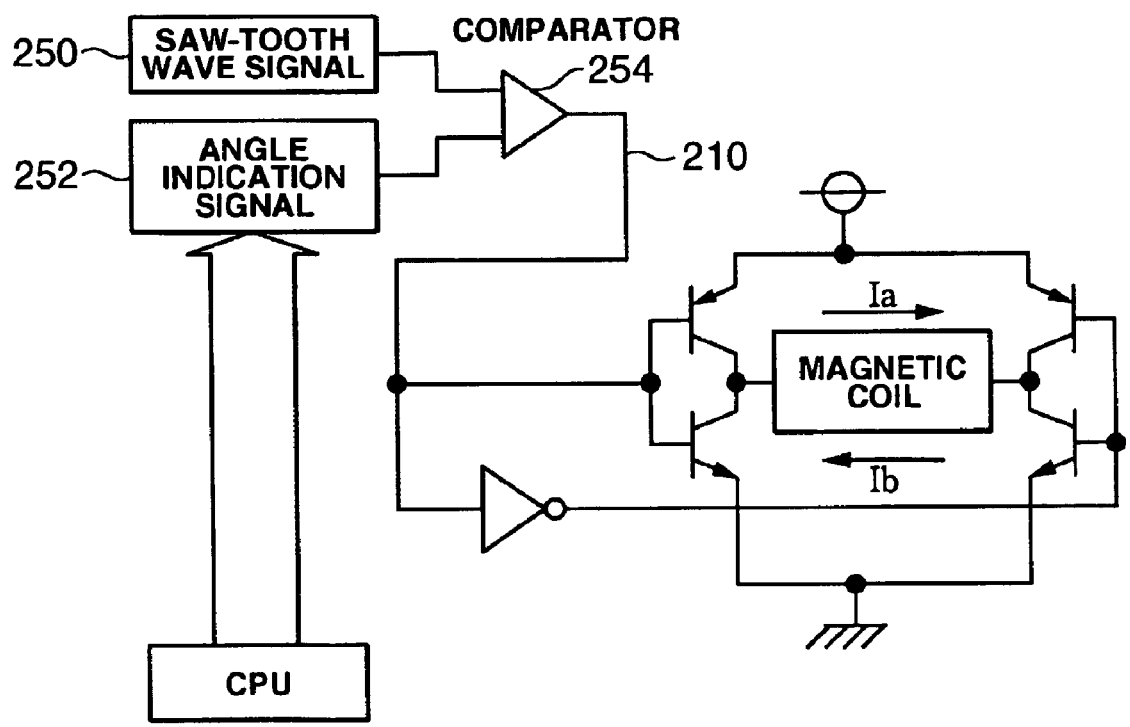
FIG. 9 is a modified example of the circuit shown in FIG. 3.

FIG. 9 is a diagram showing a modified example of the drive circuit illustrated in FIG. 3. The difference between the drive unit pertaining to the present embodiment and the drive unit illustrated in FIG. 3 is in that a duty ratio-controlled signal is supplied as the excitation signal 210. Reference numeral 250 represents a saw-tooth wave signal created with a quartz oscillator, and reference numeral 252 represents an angle indication signal created with the order of the CPU (c.f. FIG. 2). This angle indication signal is for indicating the angle of an arc in a situation of portraying a reciprocating motion in an arc with the portion in which the permanent magnet 12 is retained with the likes of a buffering holder 14 as the fulcrum. The saw-tooth wave signal and angle indication signal are compared with a comparator 254, and a signal with a duty ratio is supplied to the coil.

Figure 10:
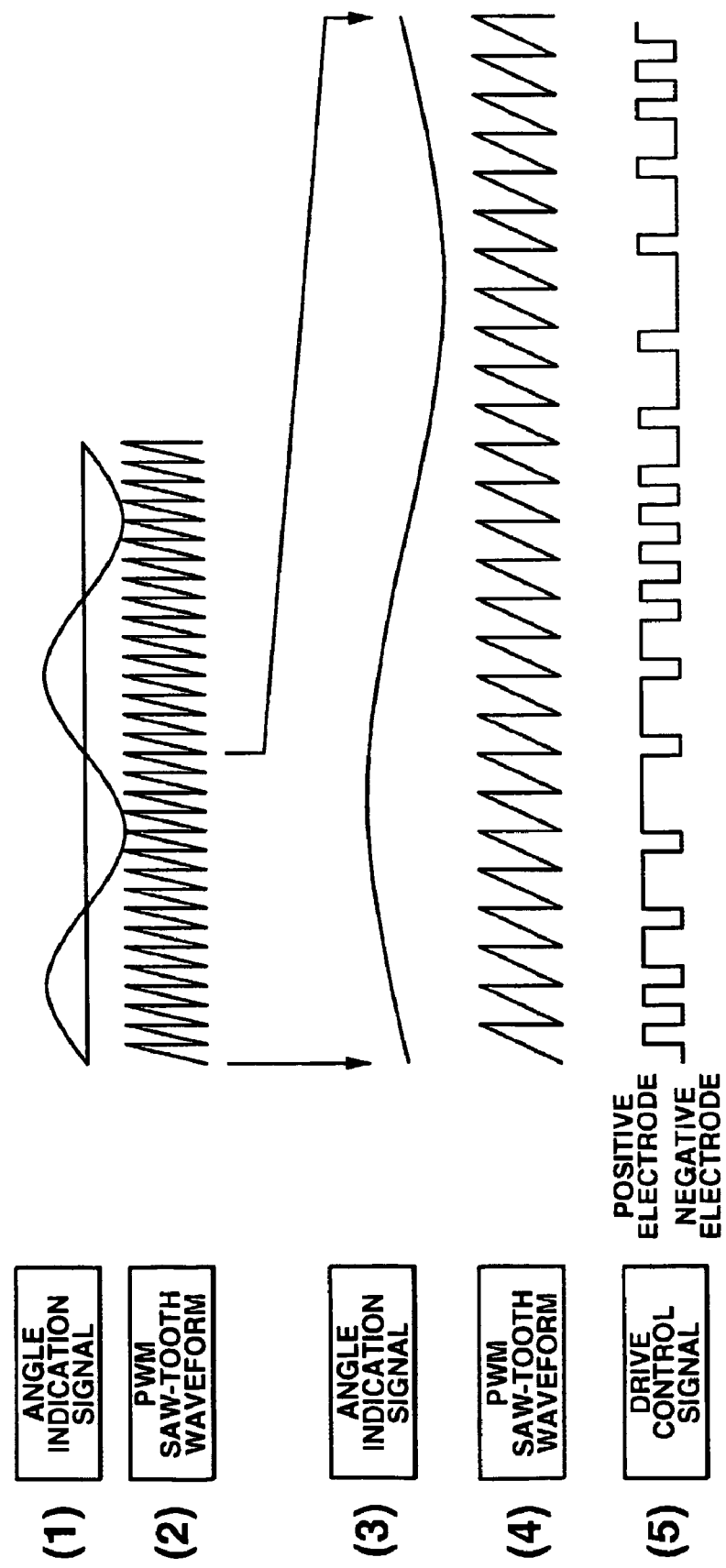
FIG. 10 is a waveform chart of the control signal employed in the circuit shown in FIG. 9.

FIG. 10 is a waveform chart corresponding to these signal waveforms, and FIG. 10(1) is an angle indication signal, FIG. 10(2) is a saw-tooth wave signal, FIG. 10(3) is an enlarged view of the angle indication signal, and FIG. 10(4) is an enlarged view of the saw-tooth wave signal. The angle indication signal and saw-tooth wave signal are compared, and an excitation signal 210 having a duty ratio as shown in FIG. 10(5) is formed thereby. As a result of changing the angle indication signal, PWM control for changing the duty ratio of the excitation signal and adjusting the angle thereof is enabled. Further, the relationship between the duty ratio and the frequency of the angle indication signal is set and stored in a prescribed table stored in the memory incidental to the CPU.

In addition to portable phones, the present embodiment may be applied to the fields of health appliances, game machines, virtual devices, small pumps, vibration sensors, spray devices, underwater speakers, mobile robots (air, land, water), valves, directional adjustment of fluids/gases, and so on.

Embodiment 7

Next, the drive mechanism pertaining to Embodiment 7 of the present invention is explained. FIG. 11 is a diagram for explaining the structure of the drive unit pertaining to Embodiment 7. In the present embodiment, unlike the drive mechanism pertaining the each of the foregoing embodiments, the permanent magnet is disposed on the fixed side, and the coil is disposed on the operational side. Further, similar effects are yielded even upon making the coil 21 shown in FIG. 8 a permanent magnet or changing the polarity of the respective electromagnets 23A, 23B.

In FIG. 11(A), the drive mechanism 300 is structured by comprising a substrate 301, a permanent magnet 302, a coil 303, an oscillation member 304, and a drive circuit 305 for driving the coil. With the permanent magnet 302 as the fixed part, one face thereof having a magnetic pole is mounted and fixed to the substrate 301. Further, an electromagnet may be employed in place of the permanent magnet 302. With the coil 303 as the transducer, the diaphragm 303a demarcating the inner periphery of the coil 303 is disposed so as to face the other face of the permanent magnet 302 having a magnetic pole. One end of the oscillation member 304 is mounted on a prescribed portion on the outer periphery of the coil 303, and the other end, although not shown, is fixed movably with a prescribed method. As a result, the coil 303 is fixed at a single point with the other end of the oscillation member 304 as the fixed point (fulcrum).

Moreover, in the present embodiment, the face of the permanent magnet 302 having an S pole is fixed to the substrate 301, and the face having an N pole is disposed so as to face the diaphragm 303a of the coil 303. Thus, the direction above the magnetic line generated by the permanent magnet 302 and the direction above the magnetic line generated by the coil 303 are approximately parallel.

Next, the basic operation of the drive unit 300 structured as described above is explained. With the drive mechanism 300, when the drive circuit 305 provides a prescribed drive signal to the coil 303, magnetic action is generated between the permanent magnet 302 and the coil 303. Since this coil 303 is fixed at a single point via the oscillation member 304, the oscillation movement of the coil 303 will become a circular movement around such fixed point. Further, as a result of the drive circuit 305 providing an AC signal to the coil 303, magnetic attraction and repulsion are mutually repeated between the permanent magnet 302 and the coil 303. As a result, the coil 303 is able to portray a circular reciprocating motion around the fixed point. Moreover, in the case of a high frequency, the diaphragm 303a also becomes a driver for generation audible sound as a flat vibrating speaker.

FIG. 11(B) shows a state where the permanent magnet 302 and coil 303 are mutually attracted, and FIG. 11(C) shows a state where the permanent magnet 302 and coil 303 are mutually repelling. As described above, an effect is yielded in that the oscillation member 304 can be reciprocated in an arc around the fulcrum. Further, since the oscillation member can be driven without having to employ a rotational motor or other mechanisms, by utilizing this oscillation member as the driving source of flying models or walking models as described above, in addition to a drive mechanism superior in drive efficiency being provided, the miniaturization and weight saving thereof can be realized with ease.

Embodiment 8

Next, the drive mechanism pertaining to Embodiment 8 of the present invention is explained. FIG. 12 is a view showing a frame format of this drive mechanism. In FIG. 12(A) and FIG. 12(B), this drive mechanism differs from the foregoing drive mechanism in that a coil is disposed on both sides of the permanent magnet 302, respectively, so as to sandwich such permanent magnet 302. Specifically, the drive mechanism is structured by comprising a permanent magnet 32, a first coil 303, a second coil 306, a first oscillation member 304, a second oscillation member 307, a first drive circuit 305 for driving the first coil, and a second drive circuit 308 for driving the second coil.

In addition, although not shown, the permanent magnet 302 shall be fixed with a prescribed method. The first coil 303 is disposed such that the hollow portion of the first coil 303 faces the permanent magnet 302; for example, the face having the N pole, and the second coil 306 is disposed such that the hollow portion of the second coil 306 faces the permanent magnet 302; for example, the face having the S pole. In other words, the first coil 303 and the second coil 306 are disposed in symmetry against the permanent magnet 302.

One end of the first oscillation member 304 is mounted on a prescribed portion on the outer periphery of the first coil 303, and one end of the second oscillation member 307 is mounted on a prescribed portion on the outer periphery of the second coil 306, respectively. And, the other respective ends of the first oscillation member 304 and the second oscillation member 307 are mounted and fixed to each other with a prescribed method. Thereby, the first coil 303 and second coil 306 are fixed at a single point with the other end of the first oscillation member 304 and the second oscillation member 307 as the common fixed point 310.

The operation of the drive mechanism structured as described above is now explained. In FIG. 12(A) and FIG. 12(b), the first drive circuit 305 and the second drive circuit 308 provide a first drive signal and a second drive signal in the reverse direction at the same timing to the first coil 303 and second coil 306.

Thereby, since a magnetic attraction effect (A) or a magnetic repulsion effect (B) will be generated at the same timing between the first coil 303, second coil 306 and the permanent magnet 302, the first coil 303 and second coil 306 will portray a circular reciprocating motion (opening and closing motion) symmetrically against the permanent magnet 302.

As described above, according to this drive mechanism, since a pair of coils capable of independent control is disposed to be symmetrical against the permanent magnet 302, and each coil is fixed at a common fixed point via the oscillation member, the respective coils will portray a circular reciprocating motion around the common fixed point and symmetrically against the permanent magnet. As a result, when this drive unit is employed in a robot, flying, walking of insects, underwater walking and above-water walking can be realized.

Embodiment 9

FIG. 13 is a view showing a frame format of Embodiment 9. In FIG. 13(A) and FIG. 13(B), this drive mechanism differs from the foregoing drive mechanism in that the permanent magnet is disposed such that the direction above the magnetic line of the permanent magnet is made to intersect with the direction on the magnetic line of the coil. In other words, in the present embodiment, the permanent magnet is structured to be inclined approximately 90 degrees.

Pursuant to the change in disposition of the permanent magnet, the first oscillation member 304 and second oscillation member 307 are fixed via a prescribed support member 309 in order to broaden the space between the first coil 303 and second coil 306.

In FIG. 13(A) and FIG. 13(B), the first drive circuit 305 and the second drive circuit 308 provide a first drive signal and a second drive signal in the same direction at the same timing to the first coil 303 and second coil 306. Thereby, since a magnetic attraction effect (A) or a magnetic repulsion effect (B) will be generated at the same timing between the first coil 303, second coil 306 and the permanent magnet 302, the first coil 303 and second coil 306 will portray a circular reciprocating motion (opening and closing motion) symmetrically against the permanent magnet 302. Further, the drive circuit is the same as the one illustrated in FIG. 9.

FIG. 14 is a view showing a frame format of a further modified example of the foregoing drive mechanism. The difference here is that the permanent magnet and coil are supported at two points. As shown in FIG. 14(A), when the drive circuit applies electricity to the coil 303 so as to generate a magnetic pole in a direction of being attracted to the magnetic direction of the permanent magnet, both fulcrums T1 and T2 move so as to move away from each other, and the distance h between the two fulcrums will broaden. Meanwhile, as shown in FIG. 14(B), when the drive circuit applies electricity so as to generate an opposite magnetic pole to the coil 303, the set of coil 303 and permanent magnet 302 oscillates so as to narrow the distance between both fulcrums. In other words, the set of magnetic bodies is driven to approach each other or pull away from each other around both fulcrums connecting the set of magnetic bodies.

As an example, this operation is similar to a pump drive or the movement of muscles and tissues of living bodies. Thus, the set of magnetic bodies may be operated to be a driving source for pump-driving the driver, or expanding/contracting the driver.

Embodiment 10

FIG. 15 is a modified example of the embodiment illustrated in FIG. 14. The difference is in that a coil is provided in place of the permanent magnet. FIG. 15(A) shows a state where a pair of coils 303a and 303b is attracted to each other, and FIG. 15(B) shows a state where a pair of coils 303a and 303b is repelling each other. Drive circuits 305a, 305b are provided to the respective coils. Further, FIG. 16 shows a state where a permanent magnet 302 is disposed between the respective coils.

Embodiment 11

FIG. 17 is a modified example of FIG. 15, and shows a state where fulcrums for supporting the coil are further provided, and the coil being supported at the three points of T1 to T3. Fulcrums T1 to T3 are disposed via an interval of 120 degrees. FIG. 17(A) shows a state where the coils are attracted to each other, and FIG. 17(B) shows a state where the coils are repelling each other.

Figure 18:
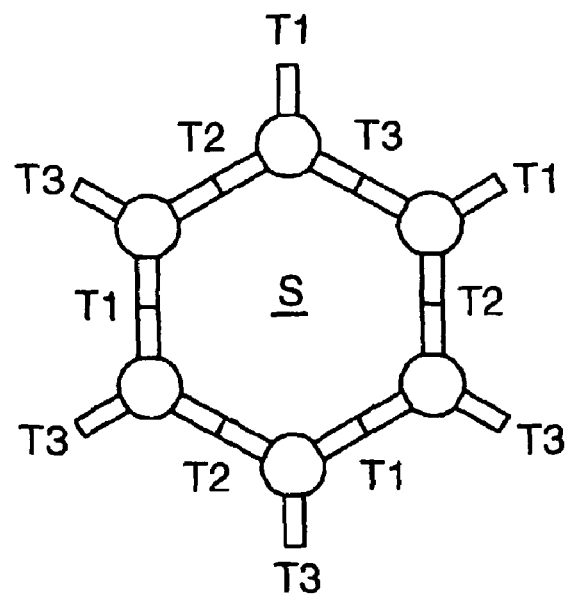
FIG. 18 is a view showing a frame format of the attachment configuration of the magnetic body.
Figure 19:
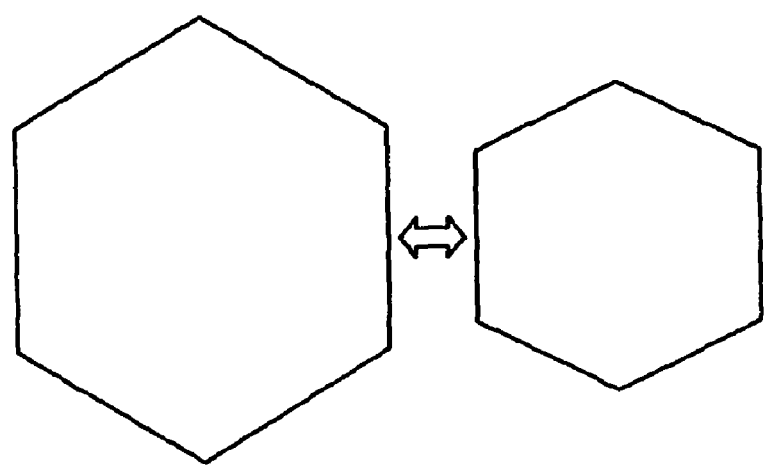
FIG. 19 is a line drawing showing the frame format of the operation thereof.

FIG. 18 shows a state where a set of coils illustrated in FIG. 17 is connected to a different set of coils via a fulcrum. By repeating this connection, a set of coils may be made into a hexagonal unit S, and, by connecting a plurality of these units, a honeycomb-shaped structure can be assembled. As a result of applying current of a prescribed polarity to the drive circuit of the coil, as shown in FIG. 19, the hexagonal unit (cell) will expand (FIG. 19(A)) and contract (FIG. 19(B)). By repeating the above, this operation of expansion/contraction can be directly provided to the drivee.

Figure 20:
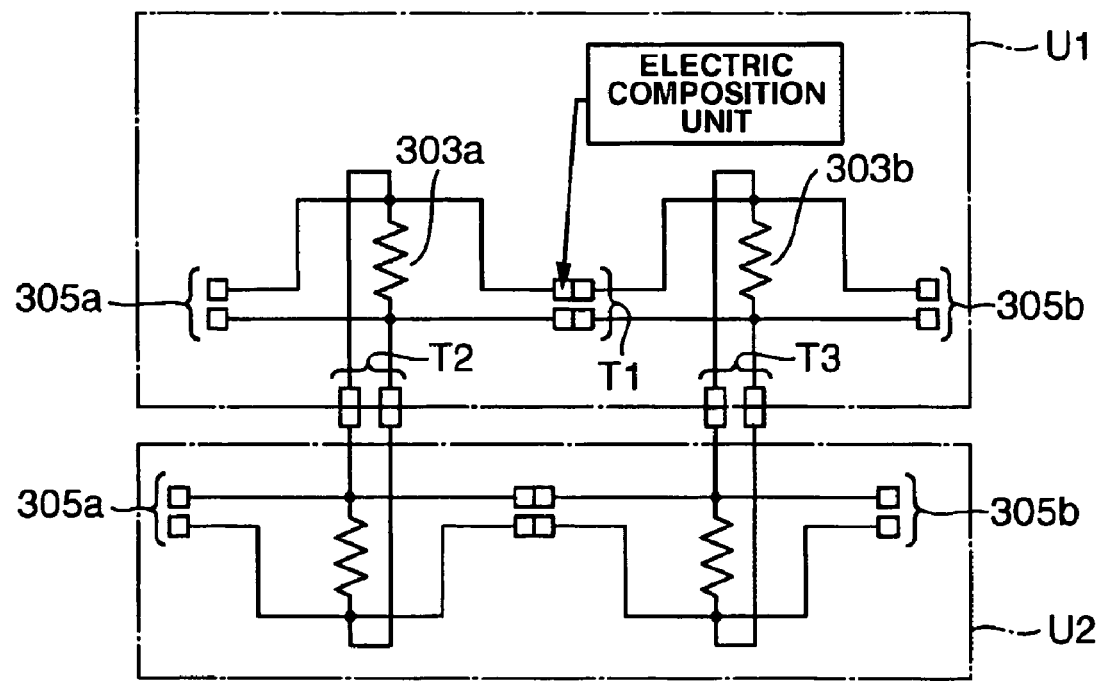
FIG. 20 is an equivalent circuit diagram showing the state where two of the units are mutually connected shown in FIG. 7.

FIG. 20 is an equivalent circuit diagram showing the state where two of the units illustrated in FIG. 17 are mutually connected. As a result of applying current having the same polarity to a plurality of drive circuits 305a, 305b, respectively, as shown in FIG. 19, the overall structure in which a plurality of coil units exists may be expanded or contracted.

Figure 21:
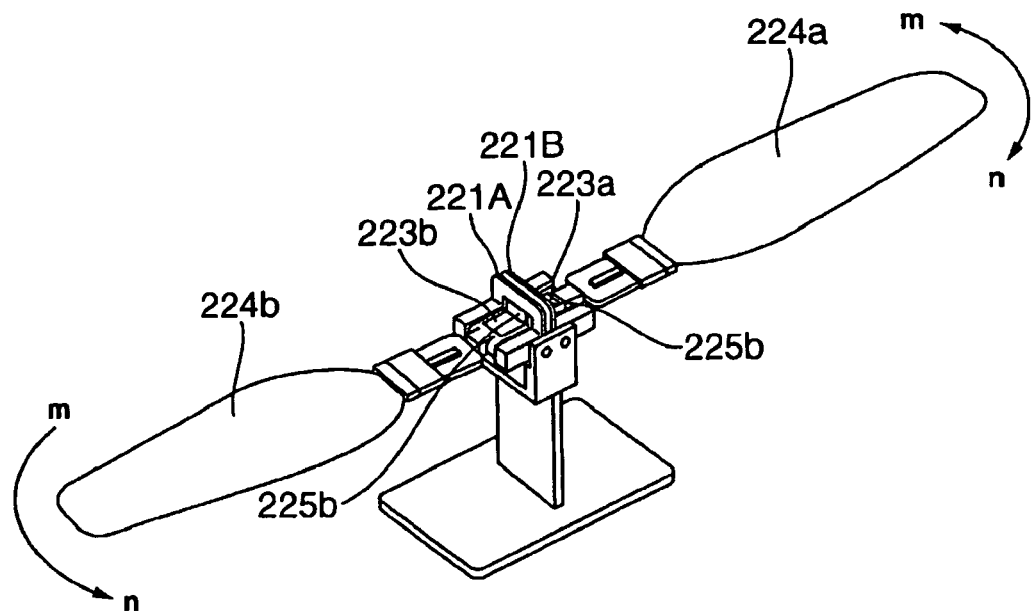
FIG. 21 is a perspective view of the drive mechanism applicable in a flight model and which realized the drive mechanism pertaining to FIG. 7.

FIG. 21 is a perspective view of the drive mechanism applicable in a flight model and which realized the drive mechanism pertaining to FIG. 7. Although the basic structure is the same as FIG. 7, this embodiment employs the oscillation members 224a, 224b as wings. In the present embodiment, since two coils 221a, 221b exist, by respectively controlling the polarity of the drive signal to be provided to each of the coils, the oscillation members 224a, 224b may be oscillated to move in the same or alternating directions m and n.

Figure 22:
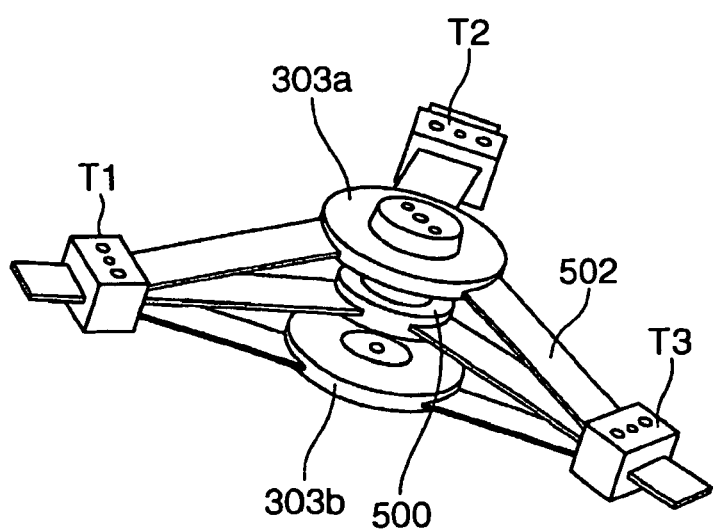
FIG. 22 is a perspective view of the drive mechanism pertaining to a modified example of the drive mechanism shown in FIG. 17.

FIG. 22 is a perspective view of the drive mechanism pertaining to a modified example of the drive mechanism shown in FIG. 17. A permanent magnet 500 is disposed between the coil 303a and coil 303b. The permanent magnet and each of the coils are connected to the respective fulcrums away from each other with the support member 502 from the fulcrums T1 to T3.

Figure 23:
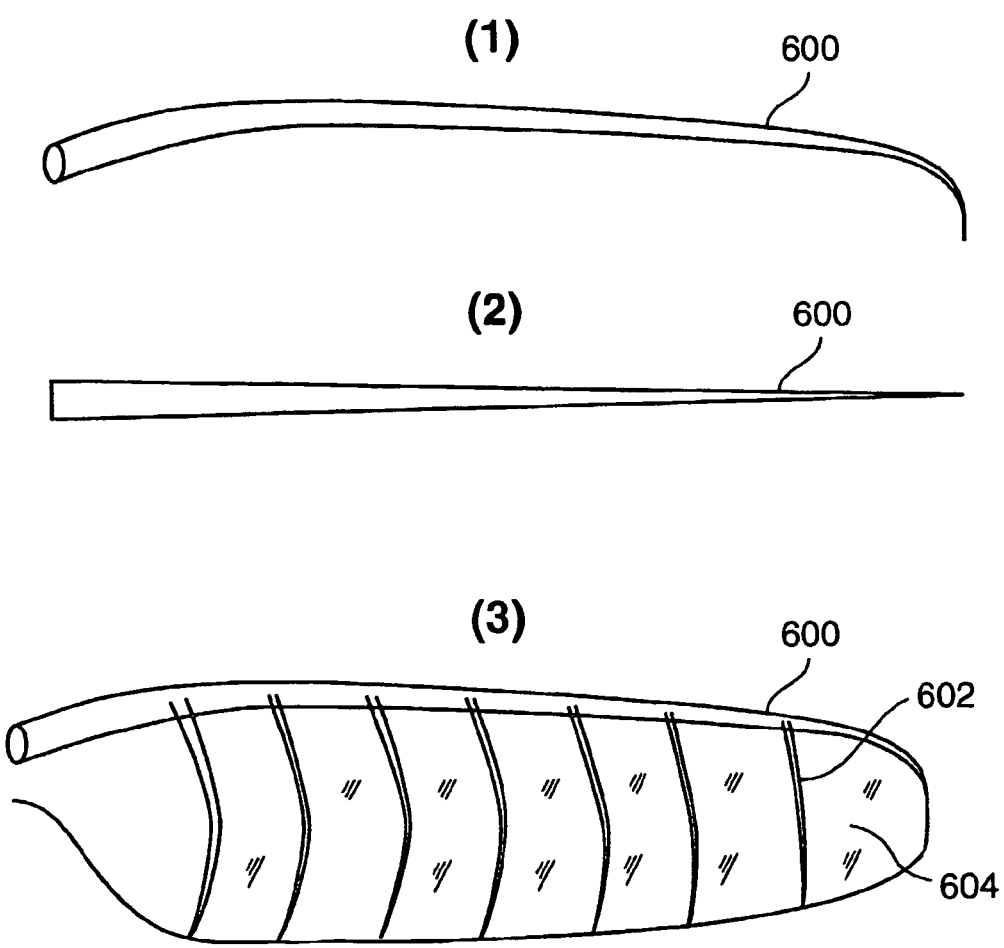
FIG. 23 is a view showing a frame format for explaining the wing structure having an improved configuration.

FIG. 23 is a view showing a frame format for explaining the wing structure having an improved configuration. This wing structure is an effective means to be integral with the drive mechanism of the present invention, or, independently as a flying means of a flying body such as a model plane. This is now explained in detail. FIG. 23 is a view showing a frame format of this wing structure. According to the present embodiment according to the present invention, this wing structure corresponds to the oscillation member.

Figure 24:
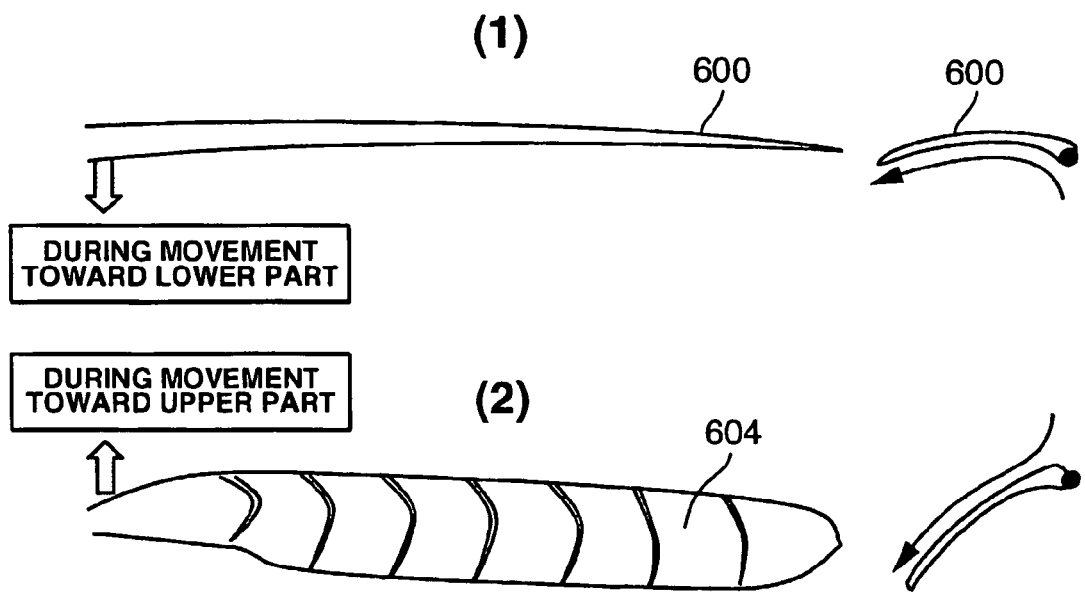
FIG. 24 is a view showing a frame format for explaining the behavior of the wing structure.

FIG. 23(1) is a plan view showing the main frame 600 structuring the wing. The main frame has a structure in which the base thereof is thick and the diameter narrows toward the tip thereof. Further, as shown in FIG. 23(1), the tip thereof is curved in an approximate U shape. As shown in FIG. 23(3), a plurality of sub frames 602 is extending approximately perpendicular from the main frame. A plurality of sub frames 602 exists in approximate even intervals. The sub frames are structured to become narrow toward the tip and to curve toward the base of the main frame. As shown in FIG. 23(3), a thin film 604 is attached to the structure formed from the main frame and sub frames. When the main frame 600 oscillates in the direction m and n as shown in FIG. 21, the sub frames 602 are made to swing in accordance with the air resistance based on the base located at the joining portion of the main frame of the sub frames 602. In other words, when the main frame oscillates in the vertical direction, as shown in FIG. 24, if the main frame is made to swing downward, the wing structure composed from the main frame and sub frames will maintain a horizontal position (c.f. FIG. 24(1)). Meanwhile, when the wing structure is move upward, the sub frames of the wing portion and the thin film 604 will drop downward (c.f. FIG. 24(2)).

Figure 25:
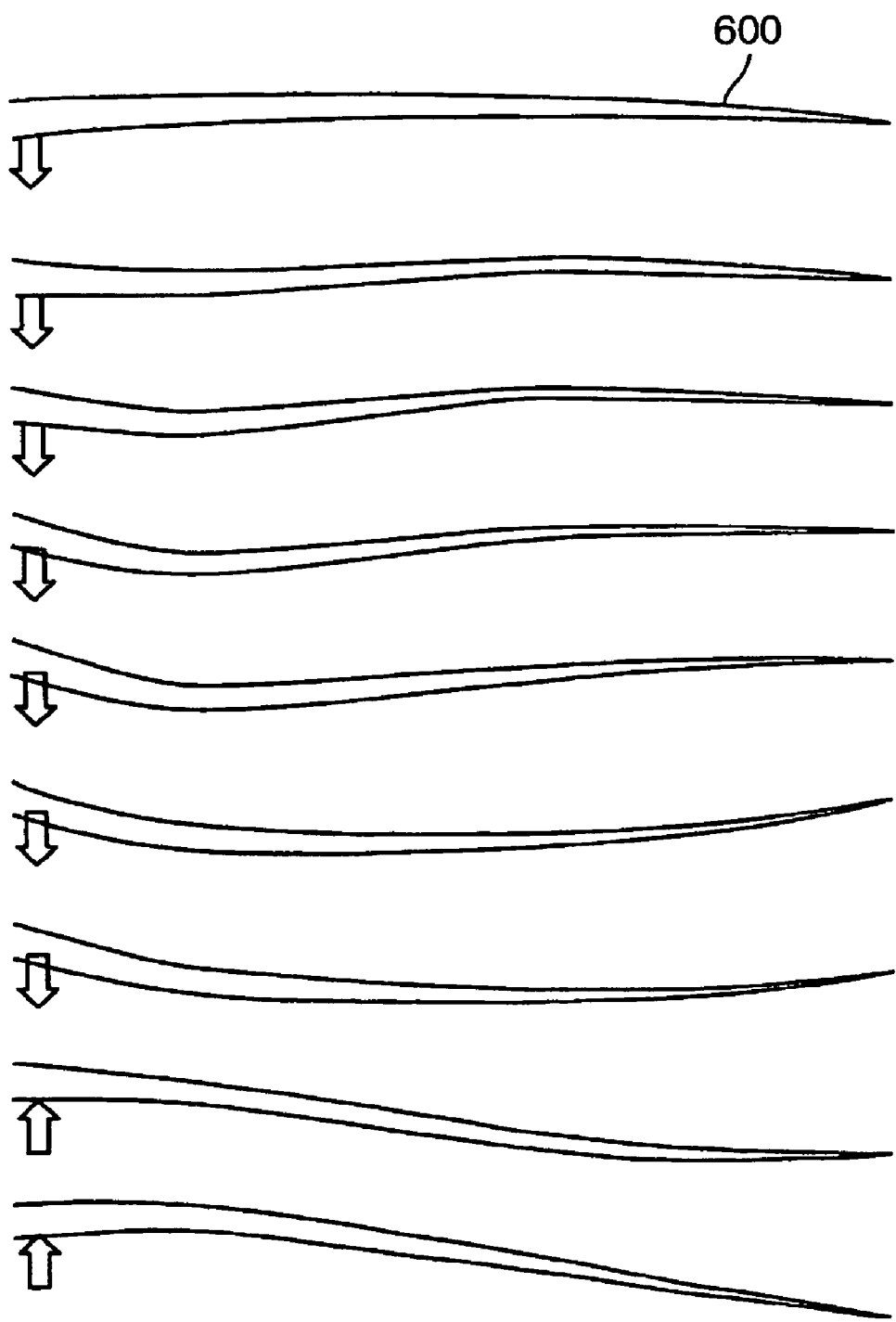
FIG. 25 is a second view showing a frame format for explaining the behavior of the wing structure.

With the vertical reciprocating motion of this wing structure; that is, when the main frame is moved vertically in a fixed cycle, the wing structure will generate a sinusoidal swing motion from the fulcrum of the main frame to the tip thereof (c.f. FIG. 25). Although this wing structure provides a pair of left and right wings to the object body, a plurality of wing structures may be provided to the object body. Similarly, the oscillation member illustrated in FIG. 21 may be provided in a pair of left and right.

According to the wing structure described above, as a result of the vertical reciprocating motion of the wing structure, propulsive force is generated horizontally, and, by applying this to a flying model or the like, the model may be made to fly. Here, the left and right wing structures may be made to oscillate independently.

The present invention may be applied to the fields of health appliances, game machines, virtual devices, small pumps, vibration sensors, spray devices, underwater speakers, mobile robots (air, land, water), valves, directional adjustment of fluids/gases, and so on. The present invention may also be utilized as artificial muscles.

Embodiment 12

Figure 26:
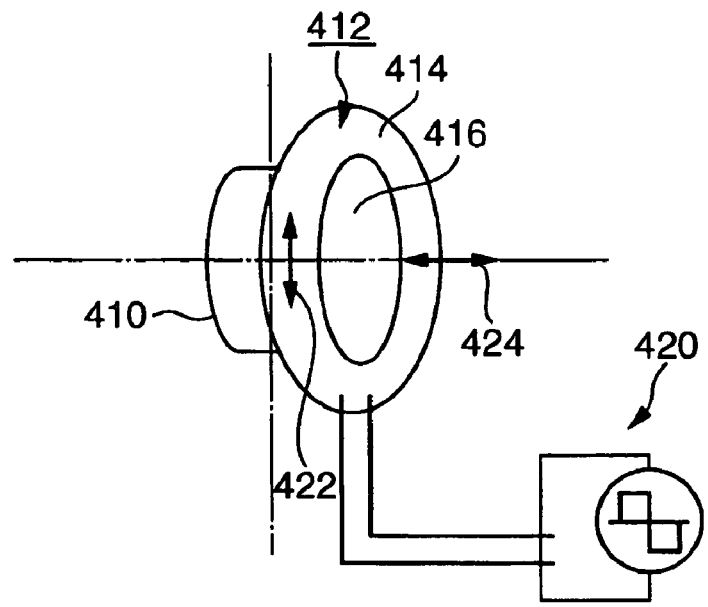
FIG. 26 is a view showing a frame format of the principle of the acoustic conversion device pertaining to the present invention.

FIG. 26 is a view showing a frame format of the principle of the present embodiment, and a pair of magnetic bodies 410, 412 disposed facing each other in a plane. One is a permanent magnet 410 and the other is a magnetic body 412 formed from a voice coil 414 and a diaphragm 416. The voice coil 414 is provided as a circular magnetic coil located outside the magnetic line of the permanent magnet 410.

The permanent magnet 410 is formed in a thin circle, wherein one surface is magnetized to the N or S pole, and the other surface is magnetized to the opposite pole. Since the diameter thereof is smaller than the magnetic coil 414, the magnetic coil 414 exists on the outside magnetic line of the permanent magnet 410.

A diaphragm (oscillation member of oscillation film) is supported at the internal diameter area of the magnetic coil 414. The diaphragm 416, for instance, is structured from an oscillatable material such as macromolecular film. The magnetic coil 414 does not exist in the oscillatable area of the oscillation member 416 surrounded by the coil 414, and exists outside the oscillatable area at the peripheral edge of the oscillation member 416. Therefore, the oscillation member 416 and the permanent magnet 410 may be drawn near as much as possible within a range that the oscillation member will not make contact during oscillation.

A drive circuit 420 for supplying a drive signal corresponding to a sound signal is connected to the magnetic coil 414. When a frequency signal is supplied to the coil, the magnetic field generated by the coil and the magnetic field of the permanent magnet interfere and the coil thereby attempts to oscillate. As described later, the permanent magnet is fixed in a housing, and the coil is also supported with a rigid portion. Thus, the oscillation of the coil is conveyed to the oscillation member 416, and, in accordance with the direction 422 of the illustrated drive current, the oscillation member oscillates alternately in the respective directions of the two-headed arrow 424.

Figure 27:
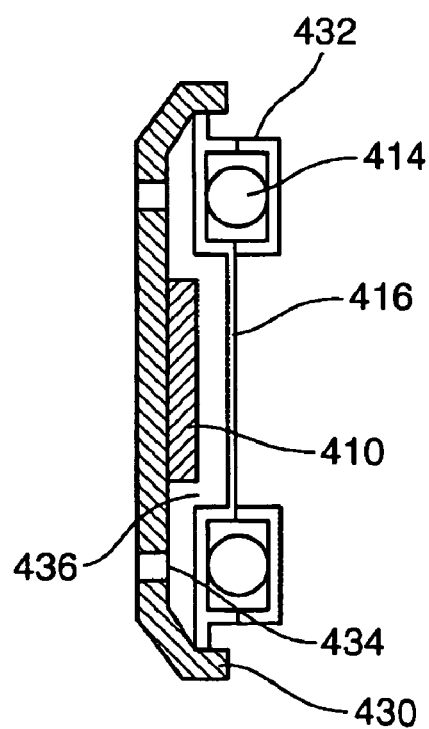
FIG. 27 is a partial cross section showing the detailed structure of the acoustic conversion device.

FIG. 27 shows a detailed structure of the acoustic conversion device pertaining to the present invention, and shows that the acoustic conversion means described in FIG. 26 is being supported with a housing 430. The cross section of the housing in the depth direction is structured in a circular approximate U shape. The permanent magnet 410 is fixed in the center of the bottom of the U shape side, and a diaphragm 416 that approaches and faces this permanent magnet is also provided. A donut-shaped flange area 432 for housing the coil 414 is formed at the inside of the peripheral edge portion of the diaphragm.

A circular coil 414 is housed in the inside of this flange area. Incidentally, reference numeral 434 is an air hole, and is a means for buffering the internal pressure change of the chamber 436 due to the oscillation of the diaphragm 416, and favorably maintaining the vibratility of the diaphragm 416.

Figure 28:
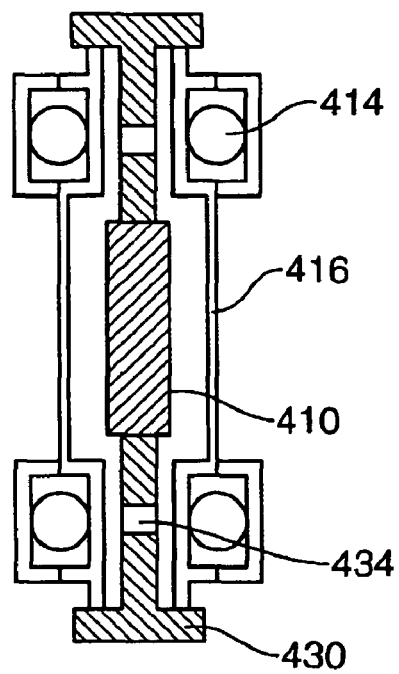
FIG. 28 is a partial cross section showing the state where the acoustic conversion means is provided to both sides of the housing.

FIG. 28 is a diagram showing a state where the acoustic conversion means illustrated in FIG. 26 is formed on both faces of the housing, and a circular permanent magnet 410 is inserted into the center of the housing 430. Each of the coils 414 on the both faces can be supplied with individual drive currents. When an antiphase drive current is supplied to the respective coils, since the two coils respectively oscillate in reverse directions, the same sound is output from the diaphragm 416 on both faces of the flat speaker illustrated in FIG. 28, and the directivity of the speaker may be eliminated.

Moreover, when an in phase drive current is respectively supplied to the two coils, since the diaphragm 416 on both faces of the flat speaker will always oscillate in the same direction, the sound pressure level of the sound output from the oscillation face will improve.

Figure 29:
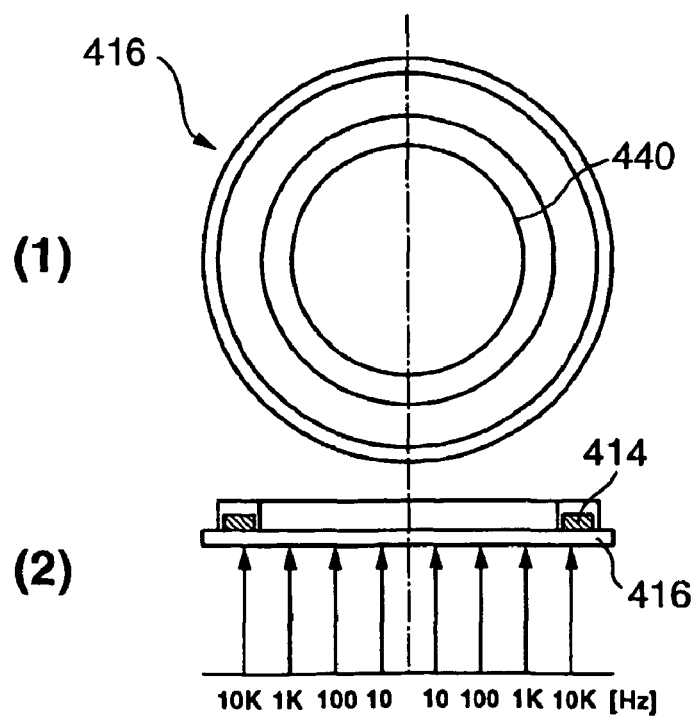
FIG. 29 is an explanatory diagram showing the relationship between the resonant position and oscillation frequency of the oscillation member.

FIG. 29 is a plan view (1) and a side view (2) of the circular oscillation means (coil 414 and oscillation material 416). FIG. 29(1) shows a state where the resonant position 440 having a prescribed diameter from the diaphragm moves toward the outside of the radial direction of the oscillation material in accordance with the increase in oscillation frequency. A coil does not exist inside the oscillation material; that is, since the coil oscillates outside the oscillatable area of the oscillation material, as shown in FIG. 29(2), it has favorable frequency characteristics even in a low frequency domain, and is capable of yielding oscillation frequency characteristics of 1 Hz to 20 kHz.

Figure 30:
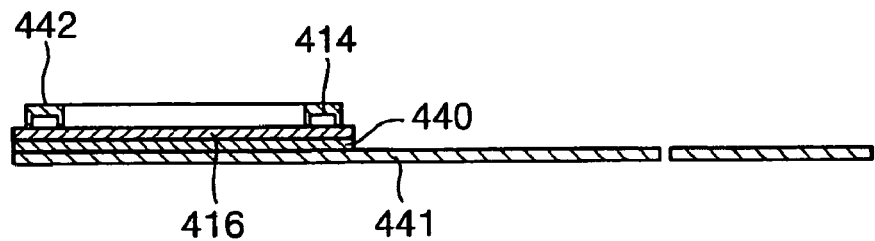
FIG. 30 is a view showing a frame format of the state where a flat speaker is loaded on the flat display portion of the display device.

The flat speaker as described above, as shown in FIG. 30, may be attached on a display film 441 of the flat display with an adhesive member 440. Further, reference numeral 442 represents a rigid body for housing the coil.

Figure 31:
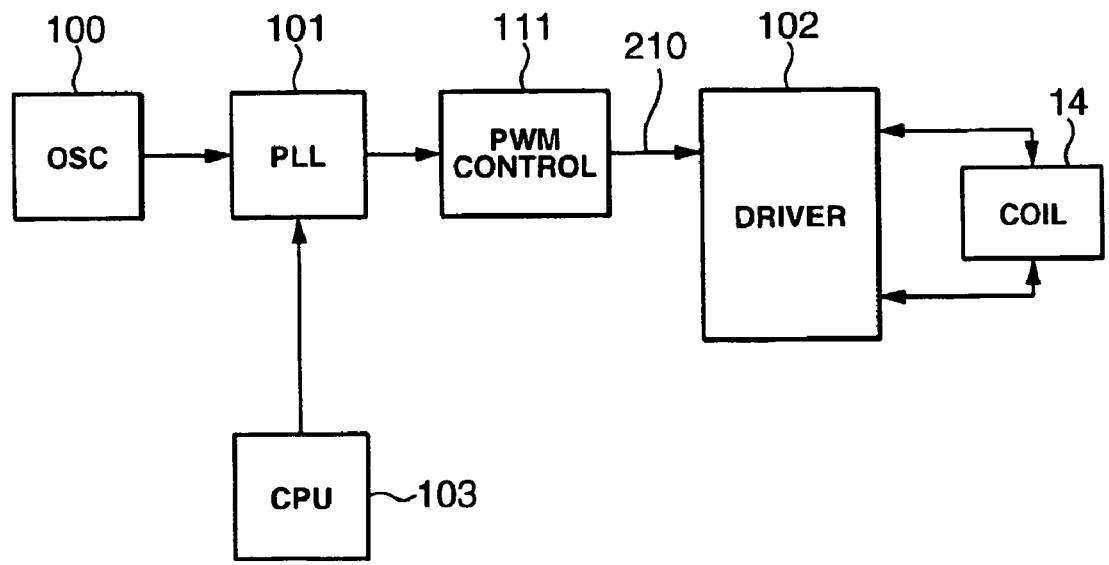
FIG. 31 is a circuit block diagram showing an example of the drive circuit.

FIG. 31 is a diagram showing the drive circuit, and this drive circuit is structured from an OSC (oscillator) 100, a PLL (Phase Locked Loop) 101, a driver 102, a PWM control circuit 111, and a CPU (Central Processing Unit) 103. The PLL 101 as the frequency control means for controlling the frequency of the drive current to be input to the coil 14 forms a basic frequency signal (saw-tooth wave described later) from a prescribed frequency, and outputs this to the PWM control circuit 111 in accordance with the control of the CPU 103. As described later, a sound source signal is supplied to this PWM control circuit 111. The sound source signal is modulated with the basic frequency signal and becomes the drive signal 210, and is then supplied to the drive 102. The drive signal is a signal having 10 to 100 times the frequency of the audio frequency described above, and this is supplied to the oscillation member illustrated in FIG. 29, and, as shown in FIG. 29(2), the resonance point moves in accordance with the frequency of the drive signal such that sound having a frequency of 1 Hz to 20 kHz can be reproduced.

The relationship between the frequency of the drive signal and the position of the resonance point will vary depending on the material of the oscillation member, rigidity of the target object (whether it is a portable phone or a display, etc.) to which the flat speaker is to be provided, and so on. Thus, it is preferable that the CPU be preprogrammed so as to be able to generate a preferable saw-tooth wave in accordance with the type of characteristics of the oscillation member or target object. In other words, the CPU 103 executes required control to the PLL upon suitably controlling the frequency of the drive signal and supplying this to the driver 102 in order to reproduce the sound of the oscillation member 16 up to a lower frequency domain. Here, by supplying a preferable frequency signal to the coil in accordance with the oscillation characteristics of the diaphragm or characteristics or the like of the target object, sound characteristics may be suitably selected. The drive circuit of the coil is similar to the one explained in FIG. 3.

Moreover, since there may be cases where a PWM control wave of a high frequency (MHz band) as described later, in such a case, an FET of an N channel and P channel is employed as the switching means of the driver circuit 102 in place of the NPN/PNP transistor.

Figure 32:
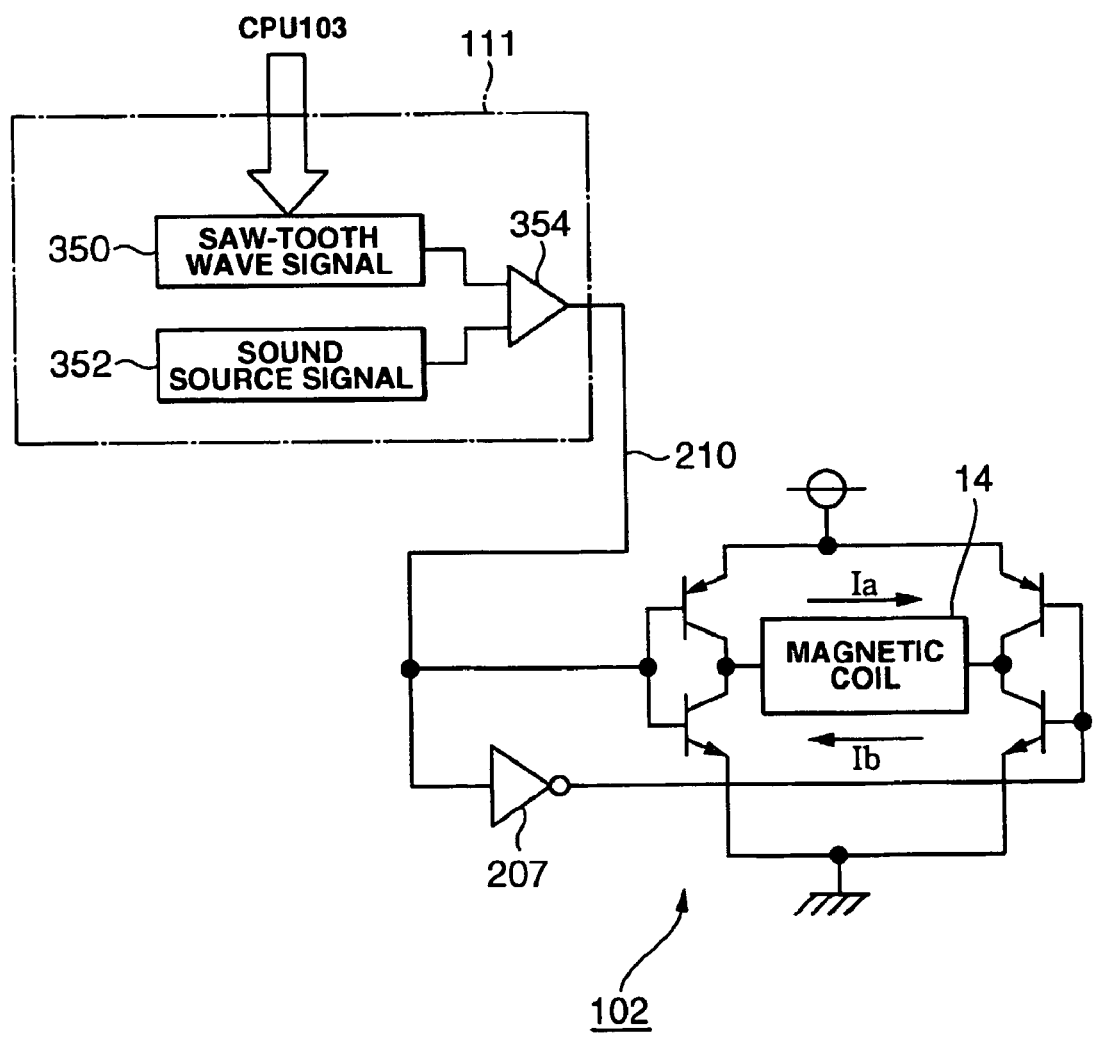
FIG. 32 is a modified circuit block diagram.

In FIG. 32, reference numeral 350 represents a saw-tooth wave signal created with the PLL circuit shown in FIG. 31, and reference numeral 352 represents a sound source signal. As described above, the CPU suitably adjusts the frequency of the saw-tooth wave in accordance with the characteristics of the oscillation member, reproducible frequency domain, or the like.

The sound source signal and saw-tooth wave signal are compared with a comparator 354, the waveform of the saw-tooth wave is modulated with the sound source frequency, and a drive signal 210 with a prescribed duty ratio is supplied to the drive circuit 102.

Figure 33:
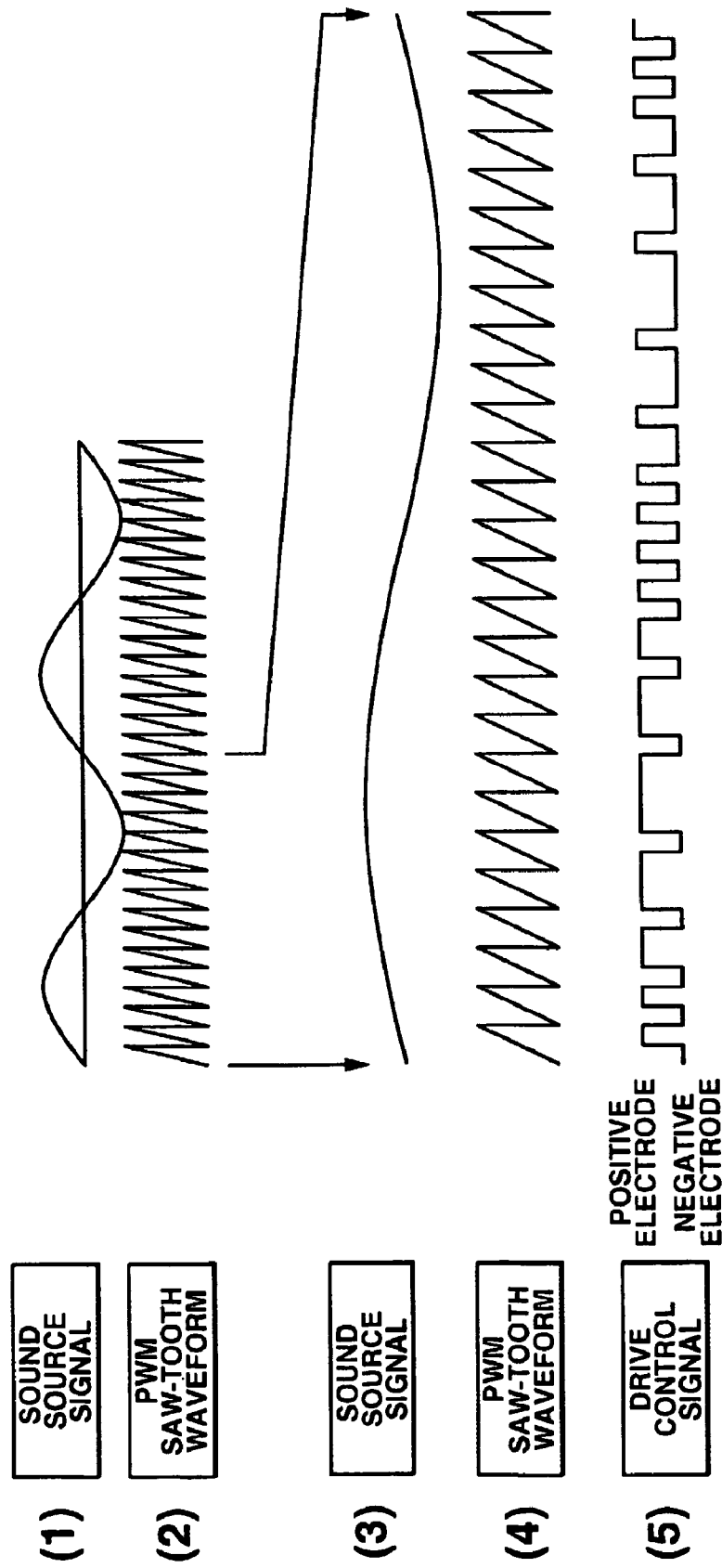
FIG. 33 is the signal waveform chart thereof.

FIG. 33 is a waveform chart corresponding to these signal waveforms, and FIG. 33(1) is a sound source signal, FIG. 33(2) is a saw-tooth wave signal, FIG. 33(3) is an enlarged view of the sound source, and FIG. 33(4) is an enlarged view of the saw-tooth wave signal. The sound source signal and saw-tooth wave signal are compared, and an excitation signal (modulated drive signal) 210 having a duty ratio as shown in FIG. 33(5) is formed thereby.

As a result of the CPU suitably changing the frequency of the basic frequency signal formed from a saw-tooth wave, a PWM control waveform in which the duty ratio of the excitation signal has been changed may be supplied to the coil 14. With respect to the drive control means of the coil shown in FIG. 32, a drive signal having a suitable frequency in accordance with the characteristics of the reproduced sound or the characteristics of the oscillation material is output, and the duty ratio of the drive signal to be supplied to the coil upon modulating the saw-tooth wave is thereby determined. The coil 14 oscillates upon receiving this duty ratio-controlled signal. By changing the duty ratio of the drive signal, a DM acoustic conversion system can be realized where the resonance point of the oscillation material is moved so as to correspond to the sound to be reproduced.

As described above, according to the acoustic conversion device pertaining to the present invention, since space is provided between the position of the conductive material (magnetic coil) and the oscillating position (oscillation area of the oscillation material); that is, since the coil exists outside the oscillation area of the oscillation material, there is an advantage in that the oscillation of the conductive body can be amplified at the oscillating portion. Moreover, since the resonance point is moved toward the center of the oscillation member for oscillation and amplification, the oscillation of the oscillating body will become stable, and stable frequency characteristics can be obtained from low frequency to high frequency. Further, as a result of providing a diaphragm to face the permanent magnet, directivity of the sound can be obtained. In addition, since the coil is disposed outside the oscillation area of the oscillation material, the coil and permanent magnet may be drawn near as much as possible, and the magnetic efficiency (efficiency of magnetism and oscillation) can be improved thereby.

Embodiment 13

FIG. 34 is a diagram showing the operational principle of the present embodiment, and a set composed from two magnetic bodies are formed from a coil 700 and a permanent magnet 702, and reference numeral 704 represents a drive circuit for supplying a frequency pulse signal to the coil. The permanent magnet 702 is disposed such that it will become a magnetic field intersecting in the direction of the magnetic field generated by the coil 700, and, in addition, the permanent magnet is supported with another member in the fulcrum in a state of being inclinable in one direction due to the polarity of the current supplied to the coil.

When a frequency signal that alternately switches the polarity of the coil 700 is supplied, the polar direction of the coil 700 is alternately switched, and, upon alternately interfering with the magnetic field of the permanent magnet 702, the permanent magnet 702 supported swingably against the coil 700 will incline in relation to the coil 700.

FIG. 34(1) is a diagram showing a case where the straight polarity supplied to the coil and the duty ratio of the current frequency signal of the reverse polarity are of the same value in both polarities. In this state, the permanent magnet 702 is positioned in the center in relation to the coil 700.

FIG. 34(2) is a diagram showing a state where the duty ratio of the frequency signal has a large value (8/10) in one polarity, and a small value (2/10) in the other polarity. In this state, the permanent magnet 702 will incline toward one side. The inclination angle of the permanent magnet is adjusted with the duty ratio.

FIG. 34(3) is a diagram showing a case of changing the small and large of the duty ratio such that the polarity of the drive signal will be the opposite of FIG. 34(2). Here, the permanent magnet 702 is controlled such that it inclines in the opposite direction in comparison to FIG. 34(2). As a result of sequentially changing the duty ratio of the PWM-controlled frequency signal supplied from the drive circuit, the permanent magnet may be made to include successively (in an analog manner) within the scope illustrated in FIG. 35(1) to FIG. 35(3). Here, in the face of FIG. 35(2) or FIG. 35(3), the micro mirror may be turned on so as to reflect the light from the light source on the projection lens. Here, the micro mirror is one of the drivers.

FIG. 35 is a diagram showing a state of applying the mechanism illustrated in FIG. 34 to a digital micro mirror device (display apparatus/reflective element of a projection device). In FIG. 35, reference numeral 706 represents a light source, reference numeral 708 represents a micro mirror (reflection plate), and reference numeral 710 is a display lens. The micro mirror 708 is fixed to one end of the permanent magnet 702, and this permanent magnet 702 inclines in one direction around the fulcrum due to the characteristics of the pulse wave (difference of the duty ratio between both polarities) applied to the electromagnetic coil 700.

As explained in FIG. 34, the permanent magnet 702 is disposed facing the coil 700 such that it generates a magnetic field in a direction intersecting with the direction of the magnetic field generated by the coil 700. In FIG. 35(1) and FIG. 35(2), the fulcrum 712 is defined within the coil area. FIG. 35(1) shows the off state of a pixel, and light from the light source 16 is not reflected toward the lens 710. Here, the duty ration in both polarities of the drive signal supplied from the drive circuit to the coil is equivalent. Meanwhile, as described in FIG. 34(2) and FIG. 34(3), when a drive signal is supplied from the drive circuit to the electromagnetic coil 700, as illustrated in FIG. 35(2), the micro mirror 708 will incline, light from the light source 706 will be reflected at the micro mirror 708, and the reflected light will reach the lens 710 to become an on state.

Contrarily, FIG. 36 is a diagram showing the operational principle of the present invention in a case where the fulcrum 712 is placed outside the area of the coil 700. The permanent magnet 702 and coil 700 are disposed such that the direction of their mutual magnetic fields will become parallel. The micro mirror 708 is laminated on one face of the permanent magnet 702. When a drive signal is supplied to the electromagnetic coil 700, the permanent magnet 702 inclines in relation to the magnetic coil 700, and the micro mirror 708 will also incline with the permanent magnet 702 as one. Reference numeral 712 represents the fulcrum provided outside the area of the electromagnetic coil.

FIG. 36(1) is a diagram showing a case where the duty ratio of the frequency signal supplied to the electromagnetic coil 700 is equivalent in both polarities. FIG. 36(2) is a diagram showing a state where the micro mirror 708 is inclining in one direction around the fulcrum 712 based on the magnetic field of the electromagnetic coil generated with the polarity in the direction in which the duty ratio is large.

The inclination angle of the micro mirror 708 is determined with the difference of the duty ratio in both polarities, and the relationship between the inclination angle and duty ratio difference is preset in a memory built in the drive circuit. The inclination angle may be successively changed in accordance with the value of the duty ratio difference in both polarities.

The drive circuit control means seeks the required duty ratio difference with reference to the foregoing table in order to obtain the desired inclination angle of the micro mirror, and supplies a frequency signal having this duty ratio difference to the electromagnetic coil.

The drive circuit is the same as those illustrated in FIG. 2 and FIG. 3.

The PLL 101 supplies a drive signal of a prescribed frequency to the driver 102 in accordance with the control of the CPU 103. For instance, a signal of 10.0 MHz to 200 MHz is input.

An excitation signal 210 flows alternately in the direction of arrow 1a or 1b, and, for instance, a signal of 10.0 MHa to 200 MHz is input. Moreover, a circuit similar to the one shown in FIG. 9 may be applied to the present embodiment as a modified example of the drive circuit.

Reference numeral 302 represents a duty ratio indication signal created with the order of the CPU described above. This indication signal is for indicating the duty ratio for both polarities, respectively, of the frequency signal supplied to the electromagnetic coil. The saw-tooth wave signal and the indication signal are compared with the comparator 304, and a signal having a duty ratio is supplied to the coil.

As a result of changing the frequency of the indication signal, PWM control for changing the duty ratio of the excitation signal is enabled.

Embodiment 14

FIG. 37 is a diagram showing another embodiment. The present embodiment differs from the foregoing embodiments in that reflective films 708R, 708G and 708B of RGB, respectively, are formed on the micro mirror 708. By changing the duty ratio of the PWM control, the drive circuit is able control the inclination of the micro mirror supported inclinably with the permanent magnet 702. FIG. 37(1) is a operational diagram for explaining the state where the micro mirror is inclined in an angle for enabling the G color reflected light from the light source to be reflected on the lens as a result of the drive signal from the drive circuit being supplied to the electromagnetic coil, and (a) shows the off state of the micro mirror and (b) shows the on state thereof. FIG. 37(2) is a diagram showing a case where the R color is driven, and FIG. 37(3) is a diagram showing a case where the B color is driven.

According to the embodiments described above, as a result of supplying a frequency signal to a magnetic body, the micro mirror may be inclined toward the lens. The inclination angle is enabled upon changing the duty ratio of the frequency signal. In other words, as a result of changing the duty ration between the polarities of the frequency signal to be supplied to the coil, the permanent magnet (magnetic body) may be inclined at an inclination based on the duty ratio difference by changing the duty ratio between the polarities of the frequency signal to be supplied to the coil.

Moreover, the drive mechanism of the present embodiment may also be applied to drivees other than the micro mirror in a digital micro mirror device.

Further, in the foregoing embodiments, although the set of magnetic bodies was structured from a permanent magnet and an electromagnetic coil, this may be structured from two electromagnetic coils. In addition, by realizing the structures of FIGS. 35, 36 and 37 with semiconductor manufacturing technology, a plurality of micro mirrors may be formed on a substrate.

Embodiment 14

FIG. 38 is a structural diagram of the principal portion (piston drive system) of the power output device pertaining to the present embodiment. In FIG. 38, reference numeral 42 is a cylindrical permanent magnet (magnet core), and is fixed to a fixed part 41 such as a housing. The end portion on the fixed part side of the permanent magnet 42 is magnetized to the S pole, and the other end is magnetized to the N pole. Reference numeral 43 is a piston formed from a bottomed hollow cylindrical body, and the permanent magnet 42 is inserted through one end of the hollow portion 43e. The piston 43 is structured from a hollow cylindrical body 43a having a hollow cylindrical shape, a flange 43b extending in the radial direction from the opening edge of the hollow portion 43e, a coil 43 wound around the side face of the hollow cylindrical body 43a in an even winding density, and a bottom plate 43d for closing one end of the hollow portion 43e. The diameter of the hollow portion 43e is designed to be slightly larger than the outer diameter of the permanent magnet 42 such that the piston 43 can freely reciprocate in a state where the permanent magnet 42 is inserted into the hollow portion 43e.

One end of a connecting rod 45 is axially stopped with the bottom plate 43d via a piston pin 44, and the other end thereof is axially stopped with a crank arm 47 via a crank journal 46. A crankshaft 48 is connected to the crank arm 47, and the reciprocating motion of the piston 43 is converted into a rotational motion of the crankshaft 48 via a crank mechanism formed from the connecting rod 45, crank journal 46 and crank arm 47. The crankshaft 48 functions as the output axis of the rotational motion, and is able to supply driving force to a drive mechanism such as a gear train not shown.

One end of the crankshaft 48 is connected to a flywheel (balance wheel) 49, and is structured to retain the rotational energy of the crankshaft 48 as inertial energy. The inertial moment of the flywheel 49 is selected to be a suitable value such that the piston 43 is able to maintain reciprocal movement with inertial force.

As a result of comprising the foregoing structure, the power output device of the present embodiment is able to make the piston 43 move reciprocally through the magnetism working between the permanent magnet as a result of supplying an alternate drive pulse signal as the excitation signal to the coil 43c, and inverting the cycle of the magnetic direction inside the piston 43. Here, as shown in FIG. 38(A), when a positive drive pulse is provided to the coil 43c, while the piston is pushed downward in the drawing due to the magnetic repulsion, as shown in FIG. 38(B), when a negative drive pulse signal is provided to the coil 43c, the piston 43 is attracted upward due to the magnetic attraction.

As described above, by sequentially supplying an alternating drive pulse signal to the coil 43c, electrical energy can be converted into a rotational motion of the crankshaft 48. Nevertheless, in the present embodiment, with the permanent magnet 42, since a relative positional relationship of the piston and permanent magnet 42 is established such that the space occupying a significant portion inside the hollow portion 43e forming the magnetic circuit, the efficiency of converting electrical energy into kinetic energy is high. For instance, in FIG. 38(A), the piston 43 is positioned at the bottom dead center, and, in FIG. 38(B), the piston 43 is positioned at the top dead center. Accordingly, the permanent magnet 42 is positioned in a space occupying more than half of the space inside the hollow portion 43e. In order to generation a strong magnetic flux inside the hollow portion 43e and to increase the magnetic repulsion and magnetic attraction working between the piston 43 and permanent magnet 42, it is desirable that the hollow cylindrical body 43a be structured from a material of high magnetic permeability. Further, as a result of adjusting parameters to a suitable value; for instance, the diameter and length of the permanent magnet 42, length of the piston 43 in the axial direction, the distance between the permanent magnet 42 inside the hollow portion 43e forming the magnetic circuit and the inner peripheral wall of the hollow cylindrical body 43a, amplitude of the drive pulse signal, number of windings of the coil 43c, length of the connecting rod, and so on, high rotating torque can be provided to the connecting rod 45. Nevertheless, when the piston stroke is excessively long, or the connecting rod 45 is unnecessarily long, these will constitute a structure disadvantageous to high-speed driving, and values of these parameters may be suitably set with reference to the mode (applicable rotation, rotating torque) of using the power output device.

Incidentally, with the explanation provided above, for the sake of convenience, although names of the structural components structuring an internal combustion engine were used to describe the respective structural components of the power output device of the present embodiment, components such as the piston 43 and connecting rod 45 do not have to be of the same material, dimension, shape, size and strength as those actually used in an internal combustion engine, and are not limited in particular so as long as they possess the material, dimension, shape, size, strength and magnetic permeability capable of efficiently converting electrical energy into kinetic energy. Here, although a structure was employed in which the piston 43 moves reciprocally in a state of the permanent magnet 42 being fixed, the structure is not limited thereto, and, for example, the permanent magnet 42 may be moved reciprocally in a state where the piston 43 is fixed, and driving force may be output with the crank mechanism provided to one end of the permanent magnet 42.

Figure 39:
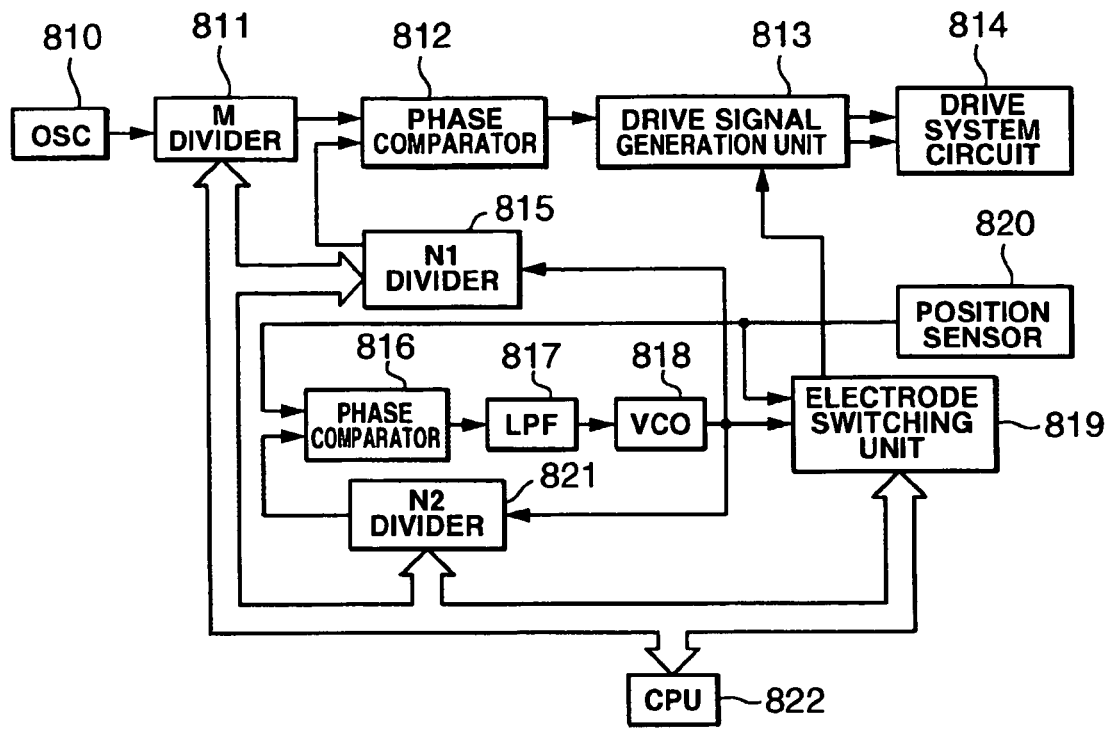
FIG. 39 is a circuit structure diagram of the drive control system of the power output device pertaining to the present embodiment.

FIG. 39 is a block structure diagram of the control system of the power output device, and FIG. 40 is a timing chart of various control signals. In FIG. 39, the position sensor 20 is a sensor for detecting the rotational angle displacement of the crankshaft 48, and is structured to output a pulse (detection signal) when the piston 43 reaches the top dead center and bottom dead center, respectively ((C), (D)). In other words, the time from the (positive) pulse of the position sensor being output up to the (negative) pulse of the position sensor being output is the time of the piston 43 moving from the top dead center to the bottom dead center; that is, this corresponds to the half-rotation time of the crankshaft 48. The output signal of the position sensor 820 and the oscillation signal of the voltage control oscillator 818 divided into 1/N2 are input to the phase comparator 816. The control system shown in FIG. 39 is structuring a feedback control circuit (phase synchronization circuit) from a phase comparator 816, a low-pass filter 817, a voltage control oscillator 818, and a divider 821, and the oscillation frequency (FIG. 40 (E)) of the voltage control oscillator 818 is adjusted to be N double the rotational frequency of the crankshaft 48.

Meanwhile, the oscillator 810 outputs a fixed frequency oscillation signal (FIG. 40(A)) to become the reference signal for controlling the piston drive system. The reference signal is divided into 1/M in the divider 811 (FIG. 40(B)). Moreover, the oscillation signal of the voltage control oscillator 818 is divided into 1/N1 in the divider 815 (FIG. 40(G)). The output signal (FIG. 40(B)) of the divider 811 and the output signal (FIG. 40(G)) of the divider 815 are input to the phase comparator 812, and the phase difference signal (FIG. 40(H)) of the two is output to the drive signal generation unit 813. As the characteristics of the phase comparator 812, in order to enable precise feedback control, it is desirable that the I/O characteristics are linear within a range where the phase difference of the input signal is minute. Here, the output signal (OSC/M) of the divider 811 and the output signal (VCO/N1) of the divider 815 are of differing phases and frequencies in a state where the system is excessive. Nevertheless, by flowing an excitation current corresponding to the phase difference signal (FIG. 40(H)) to the coil 43c, these will gradually converge into the same phase and same frequency. Thus, in an ordinary state, OSC/M=VCO/N1. Here, OSC is the oscillation frequency of the oscillator 810, and VCO is the oscillation frequency of the voltage control oscillator 818. When the rotation per unit time of the crankshaft 48 is set as x, since VC=x·N2, x=OSC·N1/M·N2. The dividers 811, 815, 821 are structured from a counter IC capable of making the dividing values programmable, and the dividing value may be changed with the CPU 822. In other words, by the CPU parameter-controlling the dividing values of the dividers 811, 815, 821, it is able to adjust the rotational speed of the crankshaft 48.

The electrode switching unit 819 incorporates the output signal of the position sensor 820, and outputs the polarity signal (FIG. 40(F)) to the drive signal generation unit 813. A polarity signal (FIG. 40(F)) is a signal for controlling the polarity (direction of the current flowing in the coil 43c) of the drive pulse signal described later, and, as shown in FIG. 40, a phase lag of $\Delta\theta$ is set against the output signal of the position sensor 820. Value of the phase lag$\Delta\theta$ is parameter-controlled with the CPU 822. The phase lag$\Delta\theta$ is provided so as to invert the polarity of the drive pulse signal in a slightly slow timing in relation to the movement of the piston 43, and the value thereof is determined in accordance with the rotational speed (bounce frequency of the piston 43) of the crankshaft 48. The drive signal generation unit 813 generates a drive pulse signal (FIG. 40(I)) to be supplied to the coil 43c from the polarity signal (FIG. 40(F)) output from the electrode switching unit 819 and the phase difference signal (FIG. 40(H)) output from the phase comparator 812. During the period when the polarity of the polarity signal (FIG. 40(F)) is negative, the drive pulse signal (FIG. 40(I)) is a three-value signal obtained by inverting the polarity of the phase difference signal (FIG. 40(H)), and acquires the values of "1", "0" and "−1".

Moreover, with the drive signal generation unit 813, in addition to the drive pulse signal, an enabling signal is also generated. The enabling signal is a signal for controlling the on/off of the excitation current to be supplied to the coil 43c, and, when the enabling signal is "0", the excitation current flowing to the coil 43c is off, and, when the enabling signal is "1", the excitation current flowing to the coil 43c is on. The enabling signal corresponds to a binary signal of the drive pulse signal ("1" and "−1" are converted to "1", "0" is converted to "0"). The drive pulse signal and enabling signal are output to the piston drive system circuit 814.

Further, when the rotational speed (requested value) of the crankshaft 48 requested by the CPU 822 and the actual rotational speed (actual value) of the crankshaft 48 do not coincide, the phase and frequency of the output signal (OSC/M) of the divider 811 and the output signal (VCO/N1) of the divider 815 will differ. Thus, by supplying a drive pulse signal corresponding to the phase difference of the two to the coil 43c, and in accordance with the feedback control of the phase synchronization circuits (816, 817, 818, 821), OSC/M=VCO/N1 can be realized. In other words, by supplying (power supply control) to the coil 43c electrical energy corresponding to the difference between the kinetic energy corresponding to the requested value and the kinetic energy corresponding to the actual value, a desired rotational speed can be obtained. Therefore, the drive signal generation unit 813 functions as a power supply means, and, as the overall feedback control system (overall system including oscillator 810, divider 811, phase comparator 812, drive signal generation unit 813, divider 815, phase comparator 816, low-pass filter 817, voltage control oscillator 818, electrode switching unit 819, position sensor 820, divider 821 and CPU 822), it functions as a power supply control means.

Here, when the requested value and actual value become equal, since the phase and frequency of the output signal (OSC/M) of the divider 811 and the output signal (VCO/N1) of the divider 815 will become equal, the phase difference signal output from the phase comparator 812 will be 0, and, even if power is not supplied to the coil 43c, the rotational motion of the crankshaft 48 can be maintained to a certain degree with the inertial energy accumulated in the flywheel. Nevertheless, when the rotational speed of the crankshaft 48 is reduced due to the rotational burden of the crankshaft 48 or the mechanical friction of the crank journal 46 and the like, and OSC/M=VCO/N1 is no longer realized, a drive pulse signal is generated from the phase difference signal of the two, and electrical energy for maintaining the rotational motion of the piston drive system is replenished. For example, when the power output device of the present invention is utilized as the power source of an electric vehicle, the requested rotational speed of the crankshaft 48 is sought from the acceleration of the driver, and, by supplying electrical energy corresponding to the difference with the actual rotational speed to the coil 43c, a desired rotational speed can be obtained.

Figure 41:
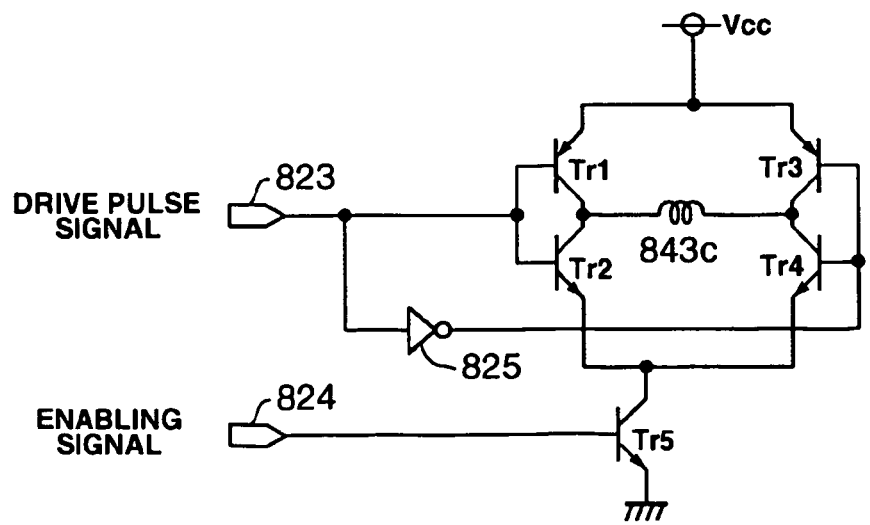
FIG. 41 is a circuit structure diagram of the piston drive system.

FIG. 41 is a structural diagram of the piston drive system circuit 814; As shown in FIG. 41, this drive system circuit 814 has a power source supply unit Vcc, transistors Tr1 to Tr5, an inverter 825 and a coil 843c, and, in addition to inputting a drive pulse signal from the input terminal 23, inputs an enabling signal from the input terminal 24, and supplies an excitation current to the coil 43c in a prescribed timing. When the drive pulse signal is "1", the enabling signal is also "1" and, therefore, the transistors Tr2, Tr3 and Tr5 will become open, and an excitation current will from the emitter terminal of the transistor Tr3 to the collector terminal of the transistor Tr2 via the coil 843c. And, when the drive pulse signal is "−1", the enabling signal is also "1" and, therefore, the transistors Tr1, Tr4 and Tr5 will become open, and an excitation current will from the emitter terminal of the transistor Tr1 to the collector terminal of the transistor Tr4 via the coil 43c.

Meanwhile, when the drive pulse signal is "0", the transistor Tr5 will become closed, and an excitation current will not flow to the coil 43c.

Moreover, when the enabling signal is "0", a back electromotive force will be generated to the coil 843c (43c) due to the reciprocating motion of the piston 43, and power will be supplied to the power source supply unit Vcc (energy regeneration mechanism). Thus, as a result of converting kinetic energy into electrical energy, energy can be regenerated. Since power is supplied from the power source supply unit Vcc to electronic circuits such as the CPU 822 in addition to the coil 43c, electrical energy can be effectively used upon performing energy regeneration control.

As described above, according to the power output device of the present embodiment, since the primary kinetic energy of the piston 43 obtained through polarity switching of the magnetic circuit with the coil 43c is utilized as a single oscillation energy, and this is converted into rotational energy of the crankshaft 48 via the crank mechanism, high output of the rotating torque can be realized. Moreover, since the flywheel 49 is connected to one end of the crankshaft 48 so as to accumulate inertial energy, the reciprocal motion of the piston 43 can be carried out smoothly. Further, since the oscillation frequency of the voltage control oscillator 818 is feedback-controlled with the PLL circuit based on the rotational speed of the crankshaft 48, and a drive pulse signal based on this oscillation frequency is generated thereby, stable system control is enabled. In addition, by making the dividing values of the dividers 811, 815, 821 variable, the rotational speed of the crankshaft 48 can be adjusted with the feedback control of the PLL circuit. Furthermore, by parameter-controlling the dividing values of the dividers 811, 815, 821 with the CPU, rotational control of the piston drive system is enabled. Moreover, by adjusting the phase lag$\Delta\theta$ of the drive pulse signal in correspondence with the respective rotations, the piston 43 can be driven smoothly.

Figure 42:
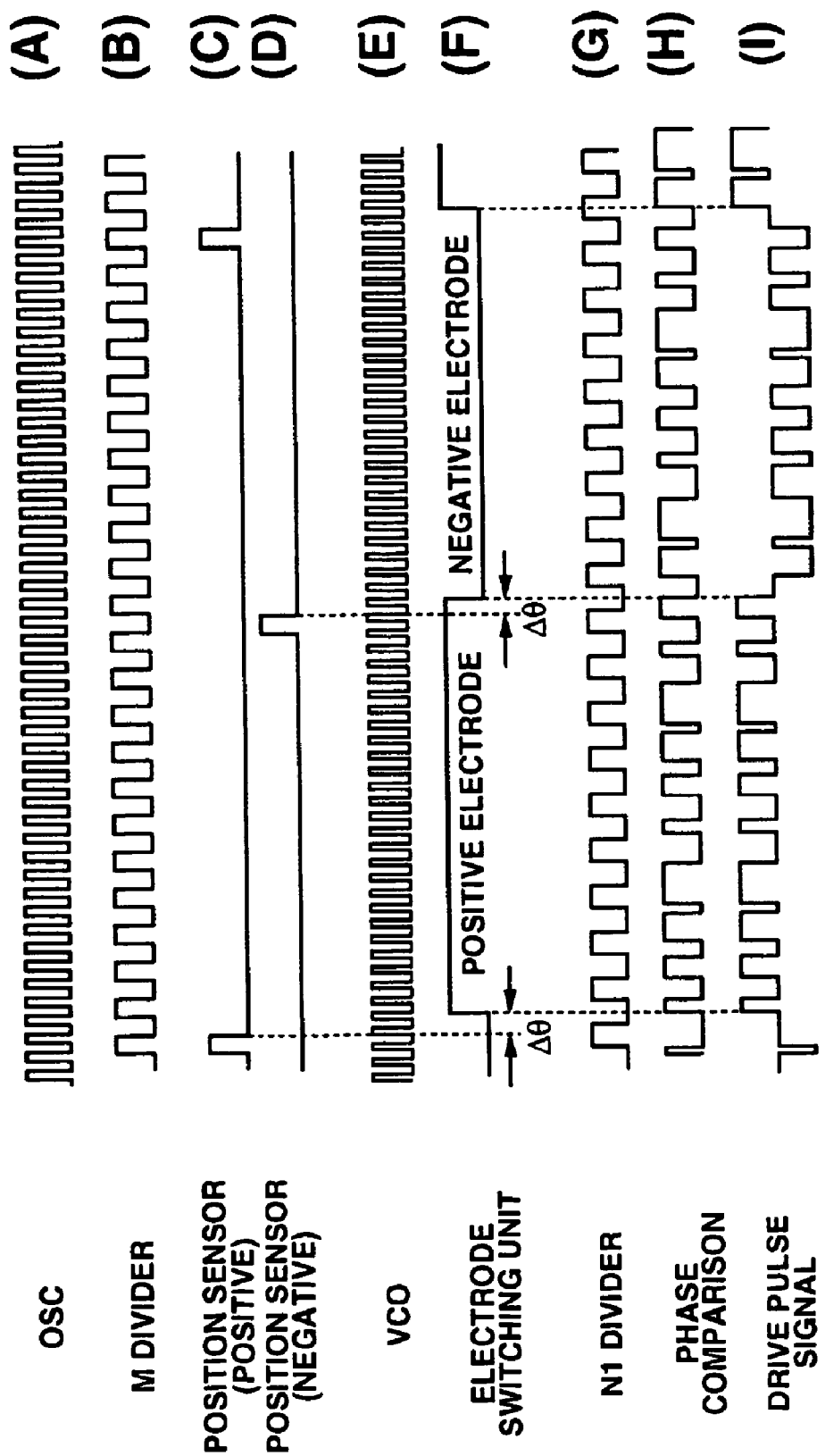
FIG. 42 is another structural examples of the power output device pertaining to the present embodiment.
Figure 43:
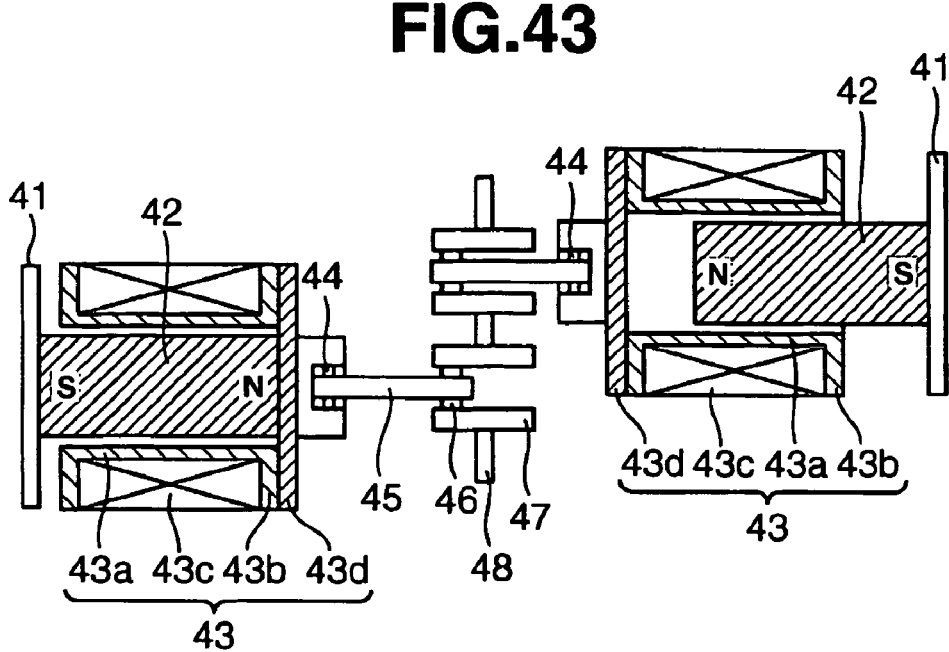
FIG. 43 is another structural examples of the power output device pertaining to the present embodiment.
Figure 44:
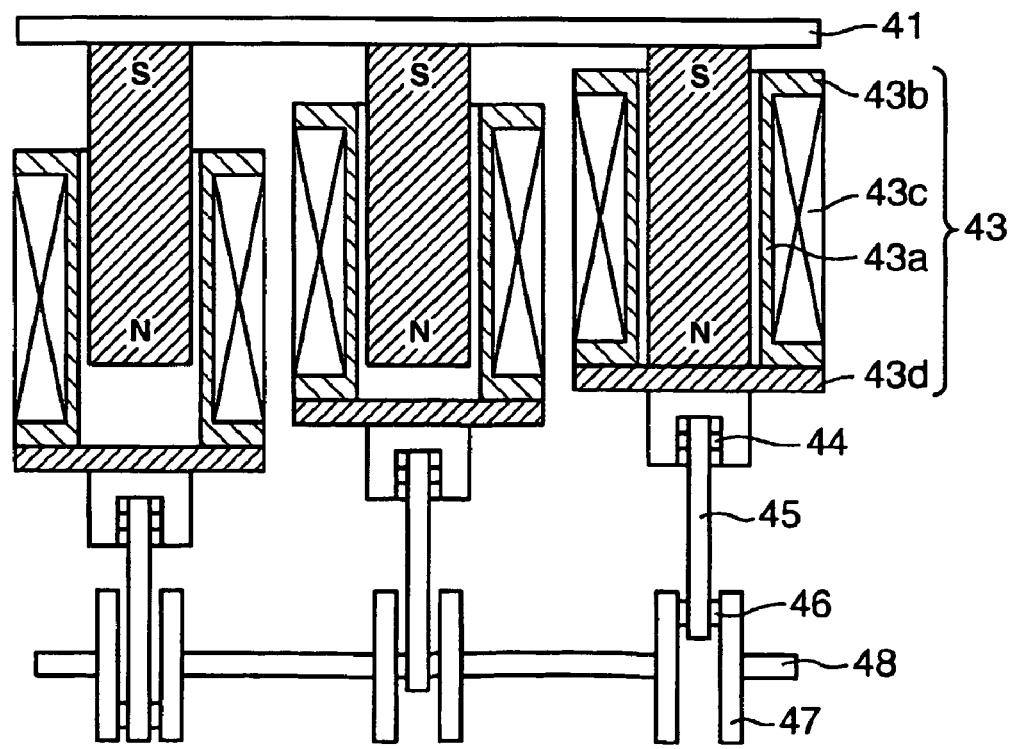
FIG. 44 is another structural examples of the power output device pertaining to the present embodiment.

Other structural examples of the power output device according to the present embodiment are shown in FIGS. 42 to 44. FIG. 42 is a diagram showing a type where two crankshafts 48 can be simultaneously rotated and driven by provided two crank mechanisms. The piston 43 is fixed to a fixed part not shown, and, with the permanent magnet 42 inserted through the hollow portion thereof, the inside of the hollow cylindrical body 43a is structured to be reciprocal along the longitudinal direction thereof. A crank mechanism formed from a connecting rod 45, a crank journal 46 and a crank arm 47 is provided to both ends of the permanent magnet 42, and a single driving source enables the structure of a biaxial output mechanism. Here, although the structure is such that the permanent magnet 42 is made to reciprocate with the piston 43 in a fixed state, this is not limited thereto, and, for instance, in a state where the permanent magnet 42 is fixed, the piston 43 may be made to reciprocate, and the crank mechanism provided to both ends of the piston 43 may be a biaxial output structure.

FIG. 43 is a diagram showing the type where the drive mechanisms of the piston 43 are disposed on the crankshaft 48 so as to face each other, and which is structured such that the phases of the pistons disposed so as to face each other are shifted 180 degrees. Here, although the illustration shows a disposition where the components face each other horizontally, this may also be disposed in a V bank. Since rotating torque from two driving sources is added to the crankshaft 48, high output of the rotating torque can be realized. Without limitation to two pistons 43, a plurality of such pistons may be disposed in the respective banks. FIG. 44 is a diagram showing a type where the pistons 43 are disposed in a cascade on the crankshaft 48. In order to realize a smooth rotational motion of the crankshaft 48, the phase difference of the respective pistons 43 are adjusted. Since rotating torque from a plurality of driving sources is added to the crankshaft 48, high output of the rotating torque can be realized.

The power output device of the present invention may be employed as a driving source of, for instance, electric vehicles, electrically operated construction machines, electrically operated farm machinery, electronic robots, electronic toys, and electronic airplanes. In addition, the present invention may also be employed as the driving source of opto-electronic control of cameras and projectors.

Although the foregoing embodiments were explained with respect to a single-phase coil, coils having two or more phases may also be employed.

The invention claimed is:

1. A drive mechanism of a micro mirror in a digital micro mirror device, comprising:
 a micro mirror support mechanism; and
 a drive circuit for supplying a drive signal to said support mechanism;
 wherein said support mechanism comprises a set formed from a plurality of magnetic bodies, said drive circuit supplies a frequency drive signal to at least one of said magnetic bodies, and said support mechanism inclines said micro mirror by making the magnetic fields from said magnetic bodies interfere with each other,
 wherein said drive circuit comprises Pulse Width Modulation control means for executing, under the Pulse Width Modulation control, the supply of said frequency drive signal to said magnetic bodies,
 wherein said set of magnetic bodies is formed from a permanent magnet bar and a coil,
 wherein one end of said permanent magnet bar supports the center of the back of said micro mirror, said coil is disposed so as to face the other end of said permanent magnet bar, and said drive circuit supplies said frequency drive signal to said coil,
 wherein a supporting axis of said micro mirror is structured with said permanent magnet bar,
 wherein a fulcrum of said micro mirror is provided on said permanent magnet bar, and said permanent magnet bar inclines around said fulcrum, and
 wherein a first incline of said micro mirror is provided by said frequency drive signal with first polarity and first duty ratio of said Pulse Width Modulation control, a second incline of said micro mirror is provided by the drive signal with first or second polarity and second duty ratio of said Pulse Width Modulation control.

2. A mechanism according to claim 1, wherein said permanent magnet and said coil are disposed in a direction such that their mutual magnetic line directions intersect.

3. A mechanism according to claim 1, wherein said permanent magnet and said coil are disposed in a direction such that their mutual magnetic line directions become parallel.

4. A drive mechanism, comprising:
 a set comprising a plurality of magnetic bodies;
 a drive circuit for supplying a frequency drive signal to said set; and
 means for producing movement caused by the attraction/repulsion between said magnetic bodies;
 wherein said movement is the driving source of said drive mechanism,
 wherein red (R), blue (B) and green (G) reflection areas are formed on a micro mirror, said drive circuit supplies said frequency drive signal to said magnetic body for each R, B and G, and, in correspondence to said frequency drive signal, and the reflective surface of the corresponding colors of said micro mirror inclines toward the reflecting direction,
 wherein said set of magnetic bodies is formed from a permanent magnet bar and a coil,
 wherein one end of said permanent magnet bar supports the center of the back of said micro mirror, said coil is disposed so as to face the other end of said permanent magnet bar, and said drive circuit supplies said frequency drive signal to said coil,
 wherein a supporting axis of said micro mirror is structured with said permanent magnet bar,
 wherein a fulcrum of said micro mirror is provided on said permanent magnet bar, and said permanent magnet bar inclines around said fulcrum,
 wherein said drive circuit comprises Pulse Width Modulation control means for executing, under the Pulse Width Modulation control, and supply of said frequency drive signal to said coil, and
 whereby a first, a second, and a third inclines of said micro mirror are provided by said frequency drive signal with polarities and duty ratio of said Pulse Width Modulation control corresponding to the R, G, and B reflective areas of said micro mirror.

* * * * *